United States Patent [19]

Inouye et al.

[11] 4,046,573
[45] Sept. 6, 1977

[54] COLOR PHOTOGRAPHIC MATERIALS

[75] Inventors: Kozo Inouye; Kotaro Nakamura; Yukio Yokota; Kiyoshi Nakazyo; Akio Okumura, all of Minami-ashigara, Japan

[73] Assignee: Fuji Photo Film Co., Ltd., Minami-ashigara, Japan

[21] Appl. No.: 669,935

[22] Filed: Mar. 24, 1976

[30] Foreign Application Priority Data

Mar. 24, 1975 Japan .................................. 50-35945

[51] Int. Cl.$^2$ ......................... G03C 1/76; G03C 1/00; G03C 1/40
[52] U.S. Cl. ............................................. 96/74; 96/9; 96/55; 96/56.6; 96/100 R
[58] Field of Search .................... 96/74, 100, 56.6, 55, 96/9

[56] References Cited

U.S. PATENT DOCUMENTS

| 3,415,652 | 12/1968 | Porter | 96/74 |
|---|---|---|---|
| 3,813,244 | 5/1974 | Villard | 96/3 |
| 3,820,990 | 6/1974 | Fix | 96/3 |

FOREIGN PATENT DOCUMENTS

| 503,752 | 4/1939 | United Kingdom | 96/22 |

*Primary Examiner*—Mary F. Kelley
*Attorney, Agent, or Firm*—Sughrue, Rothwell, Mion, Zinn and Macpeak

[57] ABSTRACT

A color photographic material comprising a support having photographic layers thereon, with at least one of the photographic layers containing a non-diffusible colored coupler which releases, on coupling reaction with the oxidation product of a primary aromatic amino developing agent at development, a diffusible dye capable of being removed from the photographic layer, the non-diffusible colored coupler being represented by general formula (I):

$$A\text{---}O\text{---}SO_2\text{---}R\text{---}B \qquad (I)$$

wherein R represents an alkylene group having 1 to 10 carbon atoms; A represents an image forming coupler residue containing a phenol nucleus or a naphthol nucleus, and wherein the —O—SO$_2$—R—B group is bonded to the coupling position of the coupler residue and the group can be released upon oxidative coupling with an aromatic primary amine developing agent to form a dye; and B represents a residue containing a chromophore.

15 Claims, 2 Drawing Figures

COLOR PHOTOGRAPHIC MATERIALS

BACKGROUND OF THE INVENTION

1. Field of the Invention

The present invention relates generally to color photography and more particularly it relates to a multilayer color photographic material having excellent color reproduction and sharpness.

2. Description of the Prior Art

A silver halide color photographic material based on the three primary color principle of the subtractive color process is fundamentally composed of a silver halide emulsion layer which is colored yellow by the action of blue light, a silver halide emulsion layer which is colored magenta by the action of green light, and a silver halide emulsion layer which is colored cyan by the action of red light.

It is well known that compounds forming dyes such as indophenols, indoanilines, indamines, azomethines, phenoxazines, phenazines, etc., by the coupling reaction with an oxidized primary aromatic amino developing agent, which compounds are called couplers, are used as color formers for such color photographic materials.

In the above described color photographic materials, acylacetamide derivatives or dibenzoylmethine derivatives are used as yellow forming couplers, 5-pyrazolone derivatives, cyanoacetyl derivatives, indazolone derivatives, or pyrazolobenzoimidazole derivatives are used as magenta forming couplers, and phenol derivatives or α-naphthol derivatives are used as cyan forming couplers.

Ideally, in such color photograhic materials based on the three primary color principle of the subtractive color process, the yellow dye image formed absorbs blue light only, the magneta dye image absorbs green light only, and the cyan dye image absorbs red light only. However, the dye images obtained in color photograhic materials using these couplers do not always correspond to the ideal, that is, they have frequently side absorptions and additionally absorb light in other wavelength regions.

A masking process using a colored coupler for correcting the desired absorption of the dye images as described in, for example, *PSA Journal*, Vol. 13, 94 (1947), is well known.

The dye image obtained from a phenol derivative or a naphthol derivative used as a cyan forming coupler has a main absorption in the red region of from about 600 nm to about 800 nm and also a side absorption in a blue wavelength region of about 440 nm. Also, to correct the side absorption, use of a phenol type or α-naphthol type colored coupler in which the phenol or α-naphthol nucleus has been substituted with an azo group at the para-position to the hydroxyl group thereof is known. However, such a para-azo substituted or a α-naphthol colored coupler usually has an insufficient color and, in particular, couplers of the above type having a sufficient color for correcting the side absorption in the green wavelength region have not yet been discovered.

Also, the dye image obtained from a 5-pyrazolone derivative used as a magenta forming coupler has a main absorption at a green wavelength region of from about 450 nm to about 550 nm and side absorptions in the red wavelength region and the blue wavelength region. To correct the side absorptions, use of a 5-pyrazolone colored coupler in which the 4-position of the 5-pyrazolone nucleus has been substituted with an azo group is also known. However, 4-azo substituted 5-pyrazolone colored couplers usually have insufficient color and, in particular, couplers of the above type having a sufficient color for correcting the side absorption in a red wavelength region have not yet been discovered.

Furthermore, conventional azo-substituted colored couplers as indicated above have a slow rate of reaction with an oxidized primary aromatic amino developing agent and hence provide an insufficient masking effect.

Still further, the color of conventional azo-substituted couplers changes as the pH of the processing solution is varied and hence they do not provide a stable color.

U.S. Pat. No. 3,476,563 discloses a naphthol coupler having structure (A) shown below:

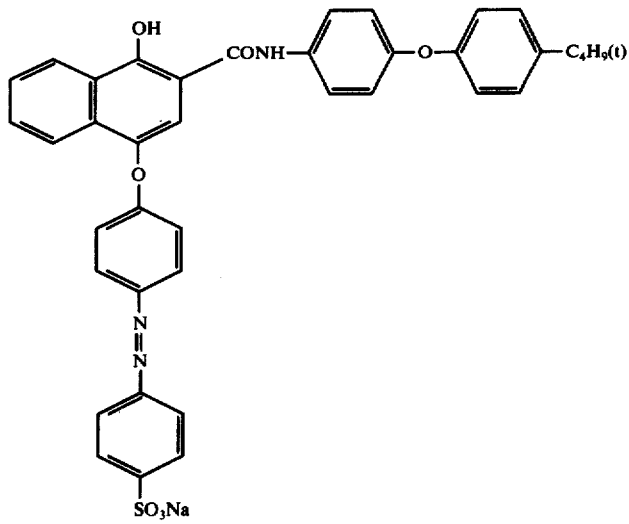

(A)

as a coupler for masking the blue wavelength region of a cyan dye image.

Since a coupler of this type shows a high masking effect and less change in color due to changes in the pH of the processing solution, the above defects of azo-substituted colored couplers can be overcome but the coupler has the difficulties that fog is formed in the photographic emulsion layers and the granularity of the silver halide emulsions is reduced.

SUMMARY OF THE INVENTION

One object of this invention is to provide a multilayer color photographic material containing in the photographic emulsion layers non-diffusible colored coupler without the above defects.

Another object of this invention is to provide a multilayer color photographic material in which a photosensitive emulsion layer sensitive to a certain wavelength region is not sensitive to the light of a wavelength region to which another differently sensitized photosensitive emulsion layer is sensitive, in other words, to provide a multilayer color photographic material showing good color separation.

Still another object of this invention is to provide a multilayer color photographic material forming a color image having excellent sharpness.

A further object of this invention is to provide a multilayer color photographic material containing photographic emulsion layers having excellent granularity.

These and other objects of this invention will become apparent from the following description of the invention.

These objects of this invention are achieved with a color photographic material containing in a photographic emulsion layer a non-diffusible colored coupler releasing, on coupling reaction with the oxidation product of a primary aromatic amino developing agent, a diffusible dye which can be removed from the photographic emulsion layer.

More particularly, accordihg to the present invention, a multilayer color photographic material is provided comprising a support having coated thereon at least a blue sensitive silver halide emulsion layer containing a yellow forming coupler, a green sensitive silver halide emulsion layer containing a magenta forming coupler, and a red sensitive silver halide emulsion layer containing a cyan forming coupler, the red sensitive silver halide emulsion layer or a gelatin interlayer adjacent the red sensitive silver halide emulsion containing a non-diffusible colored coupler releasing, on coupling reaction with the oxidation product of a primary aromatic amino developing agent, a diffusible dye which can be removed from the photograhic emulsion layer.

DETAILED DESCRIPTION OF THE INVENTION

Figure 1:
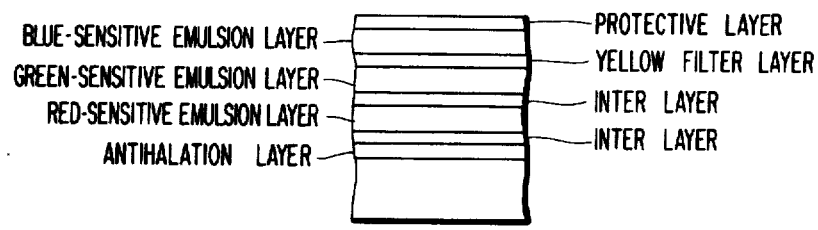
FIGS. 1 and 2 are schematic cross sectional views of color photographic materials according to the present invention.

The term "a dye which can be removed from the photographic emulsion layer" as used in this specification means that the dye can be leached out by a processing solution from the photographic emulsion layer of the color photographic material.

The non-diffusible colored couplers, each releasing by the coupling reaction with the oxidation product of a primary aromatic amino developing agent a diffusible dye which can be removed from the photograhic emulsion layer used in this invention, can be represented by the following general formula (I):

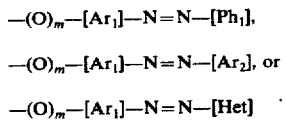

wherein R represents an alkylene group having 1 to 10 carbon atoms; A represents an image forming coupler residue containing a phenol nucleus or a naphthol nucleus, where the —O—SO₂—R—B group is bonded to the coupling position of the coupler residue, which group can be released upon oxidized coupling with an aromatic primary amine developing agent to form a dye; and B represents a residue containing a chromophore, particularly a residue consisting of an arylazoaryl group or an arylazoaryloxy group where the aryl(ene) moieties thereof include a phenyl(ene) group, a napthyl(ene) group and an aromatic heterocyclic ring, which can contain from 1 to 3 water soluble groups (or hydrophilic groups). The residue containing a chromophore may be viewed as an organic residue consisting of a dye component having its spectral absorption in the visible region.

The residue containing a chromophore described above is a residue which renders the coupler colored, and includes a known dye residue, for example, an azo dye residue such as those represented by the following formulae:

—(O)$_m$—[Ar$_1$]—N=N—[Ph$_1$],

—(O)$_m$—[Ar$_1$]—N=N—[Ar$_2$], or

—(O)$_m$—[Ar$_1$]—N=N—[Het]

wherein $m$ is 0 or 1; —[Ar$_1$]— represents an arylene group, preferably an arylene group having 6 to 12 carbon atoms which can be substituted with a lower alkyl group, e.g., with 1 to 4 carbon atoms, a halogen atom, etc., if desired (for example, a phenylene group, a naphthylene group, etc.); —[Ph$_1$] represents a phenyl group having a water soluble group or a hydrophilic group (as the water soluble group, for example, —SO$_3$M, —COOM, etc., and as the hydrophilic group, for example, an amido group, an acylamino group, a sulfonamido group, a carbonamido group, a sulfamido group, a ureido group, etc.); —]Ar$_2$] represents a hydroxynaphthyl group having a water soluble group or a hydrophilic group (as the water soluble group, for example, —SO$_3$M, —COOM, etc., and as the hydrophilic group, for example, an amido group, an acylamino group, a sulfonamido group, a carbonamido group, a sulfamido group, a ureido group, etc.) and includes, for example, the following:

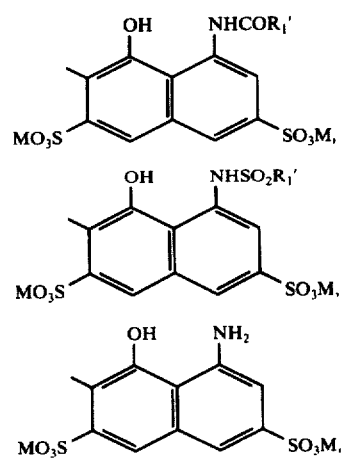

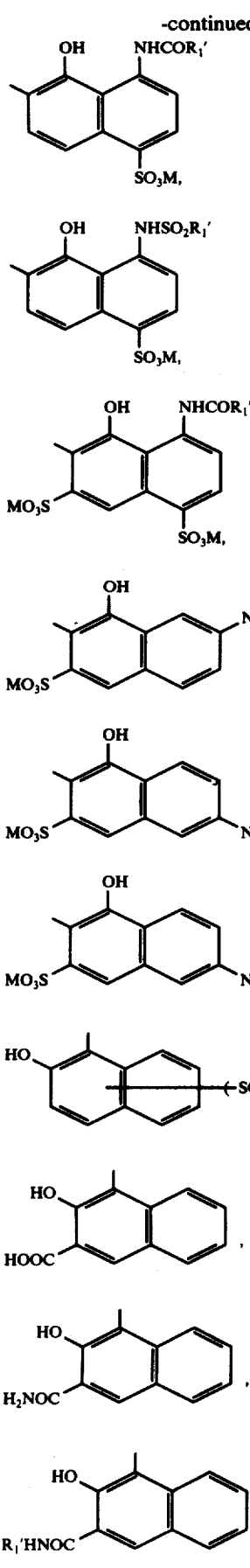

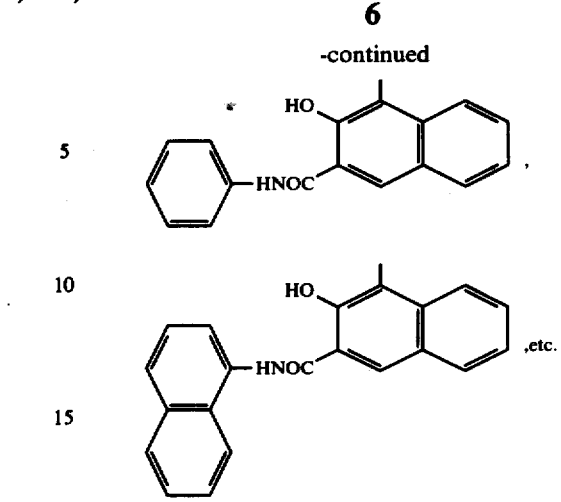

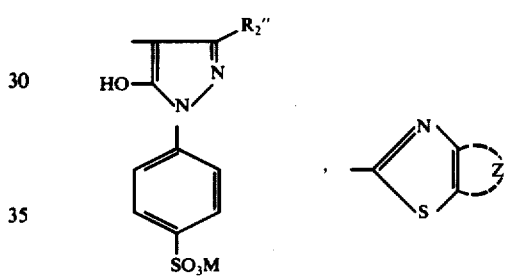

—[Het] represents an aromatic heterocyclic group, e.g., a 5-or 6-membered nitrogen containing aromatic heterocyclic group which may be condensed with a benzene ring or a naphthalene ring, if desired, preferably, an aromatic heterocyclic group having a water soluble group such as —SO$_3$M or —COOM, and includes, for example, the following:

wherein Z represents a non-metallic atom group necessary to form a fused aromatic ring, preferably a benzene ring or a naphthalene ring, which ring can be substituted with a lower alkyl group having 1 to 4 carbon atoms, a halogen atom, a nitro group, an acylamino group, and the like, if desired; M represents a cation such as an alkali metal ion, an ammonium ion, etc., or a hydrogen atom; R$_1$' represents an alkyl group having 1 to 7 carbon atoms, a hydrogen atom, a phenyl group or a naphthyl group; and R$_2$" represents an amino group, an alkyl group having 1 to 5 carbon atoms, an acylamino group where the acyl moiety thereof consists of a carbonyl group bonded to an alkyl group having 1 to 4 carbon atoms or an aryl group such as phenyl group, a sulfonamido group, a ureido group, an alkoxycarbonyl group, preferably having 2 to 9 carbon atoms, a carboxy group; and the like.

To provide diffusion resistance to colored couplers which are incorporated into a photographic emulsion layer in the practice of the present invention, all known ballast groups can be employed. For example, a group containing a hydrophobic residue having 8 to 32 carbon atoms therein may be introduced into the colored coupler which may be employed in the present invention. Such residues are called ballast groups and such are well known in the art. The ballast group may be combined directly with the skeleton of the colored coupler, or may be linked with the skeleton of the colored coupler through an imino linkage, an ether linkage, a thioether linkage, a carbon-amido linkage, a sulfonamido linkage, a ureido linkage, an ester linkage, an imido linkage, a carbamoyl linkage, a sulphamoyl linkage or the like.

Specific examples of ballast groups are given below:

1. Alkyl groups or alkenyl groups

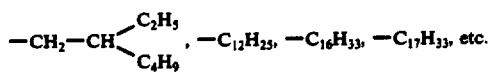

2. Alkoxyalkyl groups:

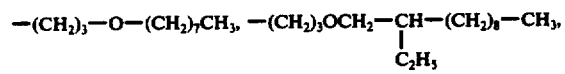

etc., as disclosed in, for example, Japanese Patent Publication 27,563/64.

3. Alkylaryl groups:

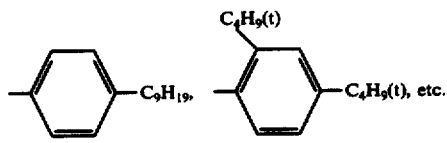

4. Alkylaryloxyalkyl groups:

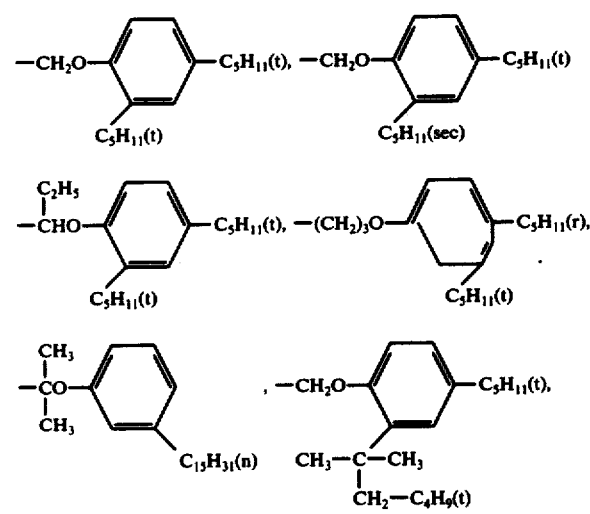

as disclosed in, for example, U.S. Pat. Nos. 2,875,057, 3,062,653 and 2,474,293 and Japanese Patent Application 69,383/73.

5. Acylamino alkyl groups:

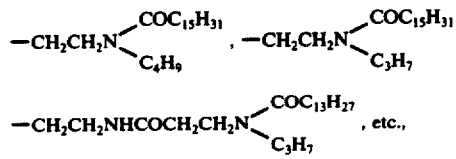

as disclosed in, for example, U.S. Pat. Nos. 3,337,344 and 3,418,129, etc.

6. Alkoxyaryl and aryloxyaryl groups:

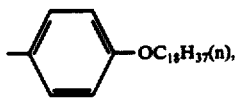

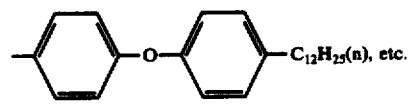

7. Residues containing both a long chain aliphatic group such as an alkyl or alkenyl group and a water soluble group such as a carboxy or sulfo group:

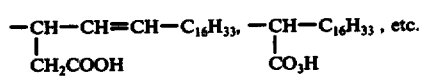

8. Ester substituted alkyl groups:

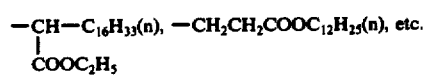

9. Alkyl groups substituted with aryl groups or heterocyclic groups:

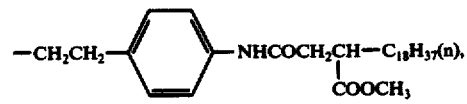

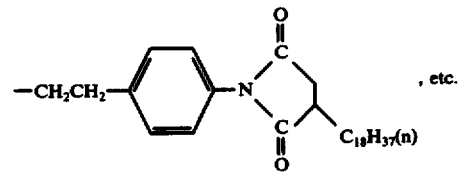

10. Aryl groups substituted with aryloxyalkoxycarbonyl groups:

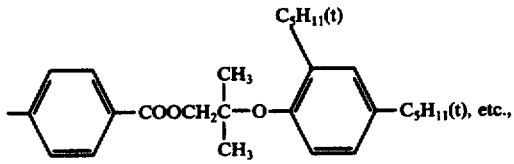

as disclosed in, for example, Japanese Patent Application 35,379,/73.

The colored couplers of the general formula (I) used in the color photographic materials of this invention have the following features.

First, a p-azo substituted phenol or naphthol which is conventionally used as a colored coupler is restricted from the standpoint of the selection of color, and, in particular, has insufficient green light absorption due to the structural restriction that the chromophore thereof is an azo group directly connected to the coupling position of the phenol or naphthol, while in the colored couplers of general formula (I), the chromophore residue is disposed apart from the coupling position and hence the color of the dye image formed therefrom can be desirably selected by selecting the type of bonding.

Second, the colored couplers of general formula (I) have sufficient coupling activity and hence a sufficient masking effect can be obtained using these colored couplers.

Third, the colored couplers of general formula (I) exhibit much less change in color due to changes in pH and hence there are less restrictions on processing.

Also, the colored couplers of general formula (I) used in this invention neither form fog in photographic emulsion layers nor reduce the granularity of the photographic emulsions, in contrast to the above naphthol couplers having an aryloxy group at the para-position to the hydroxyl group thereof as represented by formula (A).

Preferred examples of the colored couplers of this invention are represented by general formula (II):

$$R_1—A_1—O—SO_2—R—B \quad (II)$$

wherein $A_1$ represents a cyan dye forming coupler residue containing a phenol nucleus (which is preferably substituted with at least one substituent such as an acylamino group where the acyl moiety thereof consists of a carbonyl group bonded to an alkyl group having 1 to 32 carbon atoms, a cycloalkyl group having 1 to 32 carbon atoms or a mono or polycyclic aryl group having 6 to 30 carbon atoms; a carbamoyl group where the nitrogen atom thereof is substituted with one or two substituents such as an alkyl group, a cycloalkyl group or an aryl group as defined above; and can be further substituted with at least one substituent such as a halogen atom, an alkyl group having 1 to 30 carbon atoms, an alkoxy group having 1 to 30 carbon atoms or an arylthio group having 6 to 30 carbon atoms) or a cyan dye forming coupler capable of forming a cyan dye image upon coupling with an oxidation product of a para-phenylene type color developing agent, which cyan dye forming coupler contains an α-naphtholic nucleus (particularly, an α-naphtholic coupler substituted with at least one carbamoyl group as defined above for the phenol nucleus which can be further substituted with at least one substituent such as a halogen atom, an alkyl group having 1 to 30 carbon atoms, an alkoxy group having 1 to 30 carbon atoms or an arylthio group having 6 to 30 carbon atoms); the —O—SO$_2$—R—B group is bonded to the coupling position of the coupler residue and the group can be released upon oxidized coupling with an aromatic primary amine developing agent to form a dye; R and B each has the same meaning as defined in general formula (I); and $R_1$ represents an acylamino group represented by general formula (III) below or a carbamoyl group represented by general formula (IV) below:

—NH—CO—X (III)

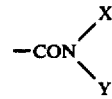
(IV)

wherein X represents a straight chain or branched chain alkyl group having 1 to 32, preferably 1 to 20, carbon atoms, a cycloalkyl group, preferably having 3 to 12 carbon atoms which includes a monocyclic or polycyclo hydrocarbon group (for example, cyclopropyl, cyclohexyl, norbornyl, etc.) or an aryl group, preferably having 6 to 10 carbon atoms (for example, phenyl or naphthyl, etc.), wherein the above described alkyl group, cycloalkyl group or aryl group can be substituted with a cyano group, a hydroxy group, a carboxy group, an amino group which can be substituted, if desired, e.g., with one or two alkyl groups having 1 to 30 carbon atoms or one or two aryl groups having 6 to 10 carbon atoms (for example, amino, alkylamino, dialkylamino, anilino, N-alkylanilino, etc.), an aryl group, preferably having 6 to 10 carbon atoms, an alkoxycarbonyl group, preferably having 2 to 30 carbon atoms, an acyloxycarbonyl group, preferably where the acyl moiety thereof consists of a carbonyl group bonded to an alkyl group having 1 to 30 carbon atoms or an aryl group having 6 to 10 carbon atoms, an amido group where the amino group thereof may be substituted, if desired, e.g., with an acyl group derived from an organic acid consisting of an acidic portion such as a sulfonyl, carbonyl, phosphonyl, etc., moiety and a residue such as an alkyl having 1 to 30 carbon atoms or an aryl having 6 to 10 carbon atoms, or a 5- or 6-membered heterocyclic group (for example, acetamido, methanesulfonamido, etc.), an imido group (for example, succinimido, etc.), a carbamoyl group which can be substituted, if desired, with, e.g., an alkyl group having 1 to 30 carbon atoms or an aryl group having 6 to 10 carbon atoms (for example, N,N-dihexylcarbamoyl, etc.), a sulfamoyl group which can be substituted, if desired, with, e.g., an alkyl group having 1 to 30 carbon atoms or an aryl group having 6 to 10 carbon atoms (for example, N,N-diethylsulfamoyl, etc.), an alkoxy group, preferably having 1 to 30 carbon atoms (for example, ethoxy, octadecyloxy, etc.), an aryloxy group, preferably having 6 to 10 carbon atoms (for example, phenoxy, p-tert-butylphenoxy, 2,4-di-tert-amylphenoxy, 4-hydroxy-3-tert-butylphenoxy, etc.), and the like; and Y represents a hydrogen atom or a group as for X.

Of the compounds represented by general formula (II), particularly preferred compounds are represented by general formulae (V) and (VI):

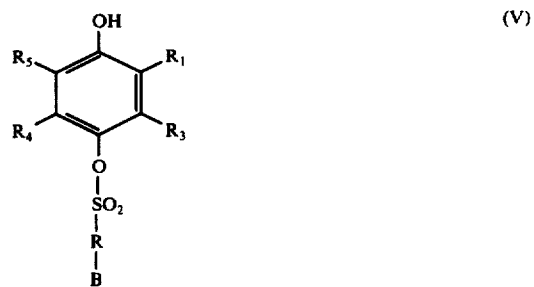

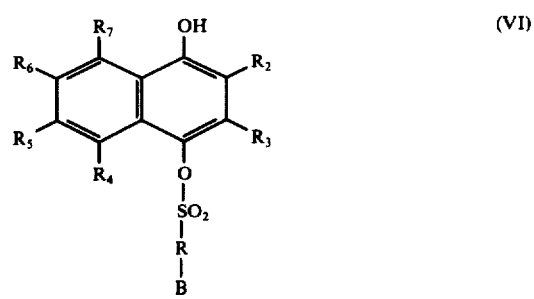

wherein R, B and $R_1$ each has the same meaning as defined for general formula (II); $R_2$ represents a carbamoyl group represented by general formula (IV); and $R_3$, $R_4$, $R_5$, $R_6$ and $R_7$ each represents a hydrogen atom, a halogen atom (for example, fluorine or chlorine), an alkyl group, an alkoxy group or an alkylthio group where the alkyl moiety of these groups preferably has 1 to 8 carbon atoms.

Specific examples of the colored couplers represented by general formula (I) are illustrated below but the invention is not to be construed as being limited to these specific colored couplers only.

1.
1-Hydroxy-4-{γ-[4-(1-hydroxy-3,6-disulfo-8-acetamido-2-naphthylazo)phenoxy]propylsulfonyloxy}-2-N-[γ-(2,4-di-tert-amylphenoxy)propyl]naphthamide.disodium salt 2.
1-Hydroxy-4-{γ-[4-(1-hydroxy-3,6-disulfo-8-acetamido-2-naphthylazo)phenoxy]propylsulfonyloxy}-2-N-(2'-chloro-5'-hexadecyloxycarbonyl)naphthanilide. disodium salt 3.
1-Hydroxy-4-{γ-[4-(1-hydroxy-3,6-disulfo-8-acetamido-2-naphthylazo)phenoxy]propylsulfonyloxy}-2-N-(2'-tetradecyloxy)naphthanilide.disodium salt 4.
1-Hydroxy-4-[4-(1-hydroxy-3,6-disulfo-8-acetamido-2-naphthylazo)benzylsulfonyloxy]-2-N-[γ-(2,4-di-tert-amylphenoxy)propyl]naphthamide.disodium salt 5.
1-Hydroxy-4-{γ-[4-(1-hydroxy-3,6-disulfo-8-acetamido-2-naphthylazo)phenoxy]propylsulfonyloxy}-2-N-hexadecylnaphthamide.disodium salt 6.
1-Hydroxy-4-{γ-[4-(1-hydroxy-3,6-disulfo-8-acetamido-2-naphthylazo)phenoxy]propylsulfonyloxy}-2-[2-chloro-5-(2,4-di-tert-amylphenoxy)acetamido]naphthanilide.disodium salt 7.
1-Hydroxy-4-{γ-[4-(1-hydroxy-3,6-disulfo-8-acetamido-2-naphthylazo)phenoxy]propylsulfonyloxy}-2-[N-(γ-decyloxy)propyl]naphthamide.disodium salt 8.
1-Hydroxy-4-{γ-[4-(1-hydroxy-3,6-disulfo-8-acetamido-2-naphthylazo)phenoxy]propylsulfonyloxy}-2-(N-dodecyl)naphthamide.disodium salt 9.
1-Hydroxy-4-{4-[4-(1-hydroxy-3,6-disulfo-8-acetamido-2-naphthylazo)phenoxy]benzylsulfonyloxy}-2-N-(β-cyanoethyl)-N-hexadecylnaphthamide.disodium salt 10.
4-{γ-[4-(1-Hydroxy-3,6-disulfo-8-acetamido-2-naphthylazo)phenoxy]propylsulfonyloxy}-2-(2,4-di-tert-amylphenoxy)acetamidophenol.disodium salt 11.
2-(2,2,3,3,4,4,5,5-Octafluoropentanamido)-4-{γ-[4-(1-hydroxy-3,6-disulfo-8-acetamido-2-naphthylazo)-phenoxy]propylsulfonyloxy}-5-tetradecanamidophenol.disodium salt 12.
2-Chloro-3-methyl-4-{γ-[4-(4-sulfophenylazo)phenoxy]propylsulfonyloxy}-6-(2,4-di-tert-amylphenoxy)acetamidophenol.sodium salt 13.
2-Chloro-3-methyl-4-{γ-[4-(1-hydroxy-3,6-disulfo-8-acetamido-2-naphthylazo)phenoxy]propylsulfonyloxy}-6-[α-(2,4-di-tert-amylphenoxy)butyramido]phenol.disodium salt 14.
1-Hydroxy-4-{γ-[4-(1-hydroxy-3,6-disulfo-8-benzamido-2-naphthylazo)phenoxy]propylsulfonyloxy}-2-(N-dodecyl)naphthamide.disodium salt 15.
3-Acetamido-6-[γ-(2,4-di-tert-amylphenoxy)butyramido]4-{γ-[4-(1-hydroxy-5-sulfo-8-acetamido-2-naphthylazo)phenoxy]propylsulfonyloxy}phenol.disodium salt The synthesis of the non-diffusible colored cyan couplers used in the present invention is illustrated by the following Synthesis Examples. Unless otherwise indicated herein, all parts, percents, ratios and the like are by weight.

SYNTHESIS EXAMPLE 1

Preparation of 1-hydroxy-4-{γ-[4-(1-hydroxy-3,6-disulfo-8-acetamido-2-naphthylazo)phenoxy]propylsulfonyloxy}-2-N-[γ-(2,4-di-tert-amylphenoxy)propyl]-naphthamide.disodium salt [Coupler (1)].

Intermediate 1
1-Hydroxy-4-[γ-(4-nitrophenoxy)propylsulfonyloxy]-N-[γ-(2,4-di-tert-amylphenoxy)propyl]-2-naphthamide:

γ-(4-Nitrophenoxy)propanesulfonic acid obtained by the reaction of 4-nitrophenol and propane sultone was treated by adding an excess amount of thionyl chloride and then heating for 3 hours under reflux in benzene to obtain γ-(4-nitrophenoxy)propanesulfonyl chloride. 2 g of the sulfonyl chloride and 2.4 g of 1,4-dihydroxy-N-[γ-(2,4-di-tert-amylphenoxy)propyl]-2-naphthamide were reacted in 20 ml of pyridine at a room temperature for 3 hours to obtain the desired compound whose melting point was 140° to 141° C.

Intermediate 2
1-Hydroxy-4-[γ-(4-aminophenoxy)propylsulfonyloxy]-N-[γ-(2,4-di-tert-amylphenoxy)propyl]-2-naphthamide:

6.4 g of Intermediate 1 prepared above was dispersed in 64 ml of ethanol and hydrogenated at 50 atm (the stoichiometrical amount of $H_2$) using a palladium-carbon catalyst in an autoclave to obtain 5.2 g of the desired compound whose melting point was 125° to 126° C.

Coupler 1
5.2 g of intermediate 2 was diazotized with sodium nitrite in a mixture solution of methyl cellosolve and hydrochloric acid in a conventional manner and added to an aqueous solution of methanol, dimethylformamide and sodium acetate containing 3.5 g of 1-hydroxy-3,6-disulfo-8-acetylaminonaphthalene.disodium salt to subject it to coupling. The resulting precipitate was separated by filtration, washed with water, dried and washed with 300 ml of acetonitrile to obtain 2.8 g of the desired compound whose melting point was above 300° C.

SYNTHESIS EXAMPLE 2

Preparation of 2-chloro-3-methyl-4-{γ-[4-(1-hydroxy-3,6-disulfo-8-acetamido-2-naphthylazo)-phenoxy]propylsulfonyloxy}-6-[α-(2,4-di-tert-amylphenoxy)butyramido]phenol.disodium salt Intermediate 1
2-Chloro-3-methyl-4-acetyloxy-6-[α-(2,4-di-tert-amylphenoxy)butyramido]phenol:
2-Chloro-3-methyl-4-hydroxy-6-[α-(2,4-di-tert-amylphenoxy)butyramido]phenol was prepared by reducing 2-chloro-3-methyl-6-[α-(2,4-di-tert-amylphenoxy)- butyramido]-p-quinone provided by the reaction of 2,4-dichloro-3-methyl-6-[α-(2,4-di-tert-amylphenoxy)-butyramido]phenol with sodium nitrate. 2,3-dihydropyrane is easily synthesized by heating a tetrahydrofurfuryl alcohol in the presence of alumina. All other starting materials are commercially available or synthesizable in an obvious manner.

263 g of 2-chloro-3-methyl-4-hydroxy-6-[α-(2,4-di-tert-amylphenoxy)butyramido]phenol and 5 g of sodium acetate were dissolved in 500 ml of glacial acetic acid and heated for 30 minutes at 80° C. After cooling the reaction solution, 1.5 l of water and 2 - 3 drops of concentrated sulfuric acid were added thereto and the system stirred at room temperature for 30 minutes and the diacetyl compound was deposited in the form of an oil. The oil was dissolved in 2 l of dimethylformamide and a solution of 1 l of water, 250 g of sodium carbonate and 1 l of methanol was added thereto and the system stirred at room temperature for 1 hour. 150 ml of concentrated hydrochloric acid was then added to the mixture and the mixture was poured into water and the precipitated crystals were recrystallized from methanol to obtain 212 g of the desired compound having a melting point of 188° to 190° C.

Intermediate 2
3-Chloro-2-methyl-4-(tetrahydropyran-2-yloxy)-5-[α-(2,4-di-tert-amylphenoxy)butyramido]phenol:

A mixture of 162 g of Intermediate 1, a small amount of anhydrous p-toluene sulfonic acid and 300 ml of 2,3-dihydropyrane was stirred at a room temperature for 2 hours and 100 ml of a 10% aqueous solution of sodium hydroxide and 200 ml of ethanol were then added thereto and the system stirred at 40° C for 2 hours. After distilling off the solvent, 400 ml of methanol, 300 ml of water and 15 ml of acetic acid were added thereto and 150 g of the desired compound was precipitated; the melting point thereof was 191° to 192° C.

Intermediate 3
2-Chloro-3-methyl-4-[γ-(4-nitrophenoxy)-propylsulfonyloxy]-6-[α-(2,4-di-tert-amylphenoxy)-butyramido]phenol:

30 g of Intermediate 2 was dissolved in 100 ml of pyridine, 20 g of γ-(4-nitrophenoxy)propanesulfonyl chloride was added thereto while cooling with ice and the system stirred at room temperature for 5 hours. The reaction solution was then poured into an aqueous hydrochloric acid solution (1.5N, 1l). The precipitate was dissolved into 100 ml of ethanol and 20 ml of concentrated hydrochloric acid (12N) was added thereto. After refluxing for 10 minutes, the mixture was poured into water and the precipitated crystals were recrystallized from ligroin to obtain 32 g of the desired compound; the melting point thereof was 97° to 98° C.

Coupler (13)

10 g of Intermediate 3 was reduced in the same manner as described in Synthesis Example 1 to obtain 8.2 g of the corresponding amino compound. 8.2 g of the amino compound was diazotized in the same manner as described in Synthesis Example 1 and then subjected to coupling with 5 g of 1-hydroxy-3,6-disulfo-8-acetamidonaphthalene.disodium salt to obtain 9.8 g of the desired compound; the melting point thereof was above 300° C.

The non-diffusible colored couplers of the present invention have many advantages: high stability; ease of preparation; less adverse affect on latent images, etc. in comparison to a non-diffusible colored coupler having an arylsulfonyloxy type coupling releasable group such as 1-hydroxy-4-[1-hydroxy-2-(4-methoxyphenylazo)-8-acetamido-5-naphthyl]sulfonyloxy-2-N-[γ-(2,4-di-tert-amylphenoxy)propyl]naphthamide.

The multilayer color photographic material of this invention can have, in addition to silver halide photographic emulsion layers, various auxiliary layers such as, for example, an antihalation layer, a light filter layer, a color contamination prevention layer, an anti-color irradiation layer, a protective layer, etc.

In the multilayer color photographic materials of this invention, the colored coupler such as, for example, the colored couplers represented by general formula (I), can be incorporated into the silver halide photographic emulsion layers or into the auxiliary layers.

In particular, when the colored coupler of general formula (I) is incorporated in the silver halide photographic emulsion layer of the color photographic material, the colored coupler is usually incorporated in a red sensitive silver halide emulsion layer together with a colorless cyan forming coupler, and, in this case, it is particularly preferred in the combination of both couplers that the coupling speed of the colored coupler of general formula (I) be higher than that of the colorless cyan coupler since in such a case an effective masking effect is obtained with a low mask density.

Furthermore, the colored coupler of general formula (I) can be incorporated in an auxiliary layer which does not contain any silver halide and disposed adjacent the red sensitive silver halide emulsion layer. In this case, the oxidation product of a primary aromatic amino developing agent formed in the red sensitive silver halide emulsion layer by the development of the red sensitive emulsion layer partially diffuses into the auxiliary layer containing the colored coupler of general formula (I), whereby the oxidation product exhibits a masking effect by a coupling reaction with the coupler, and, at the same time, the formation of color mixing caused by the diffusion of the oxidation product into the other silver halide photographic emulsion layers can be prevented. Such effects are particularly marked when the coupling speed of the colored coupler of general formula (I) is higher. The colored coupler of the present invention is preferably used in combination with a conventional colorless coupler or couplers so that the relative coupling speed of the colored coupler is 1 to 10 times, preferably 1.3 to 5 times, higher than that of the conventional colorless couplers. Also, in this case, to further increase the color contamination prevention effect, a hydroquinone derivative as later described as a fading prevention agent for color images can be used.

In the multilayer color photographic materials of this invention, various layer structures can be selected depending on the purpose of the color photographic materials. For example, a red sensitive silver halide emulsion layer, a green sensitive silver halide emulsion layer, and a blue sensitive silver halide emulsion layer can be formed in this order on a support and further this order of the layers can be changed. Moreover, at least one of the red sensitive silver halide emulsion layer, the green sensitive silver halide emulsion layer, and the blue sensitive silver halide emulsion layer can be divided into two or more layers and, in this case, two or more of the separate layers sensitive to the same wavelength region can be disposed adjacent each other or can be separated by another silver halide emulsion layer sensitive to a different wavelength region or another auxiliary layer.

The layer constitution of the light sensitive material of the present invention can be as disclosed in, for example, U.S. Pat. Nos. 3,726,681 and 3,516,831, British Patents 818,687 and 923,045, German Patent Applications (OLS) 2,322,165 and 2,018,341 (which corresponds to U.S. patent application Ser. No. 259,108) and Japanese Patent Application 5,179/75.

When the red sensitive silver halide emulsion layer and the green sensitive silver halide emulsion layer of the multilayer color photographic material of this invention are in an order such that the red sensitive silver halide emulsion layer is disposed nearer the support and, in this case, the colored cyan coupler of general formula (I) having, in particular, an absorption in the green wavelength region, is incorporated in the auxiliary layer disposed between the red sensitive silver halide emulsion layer and the green sensitive silver halide emulsion layer, the sharpness of the color images is also improved by a so-called "unsharp masking effect" caused by a diffusion of the oxidized product of a primary aromatic amino developing agent in addition to the masking effect and the color contamination prevention effect. Further, the fading of the magenta dye image caused by the re-reflection of green light and also the occurrence of color contamination in the red sensitive silver halide emulsion layer of an undesired sensitive region in the green wavelength region can be prevented since when the color photographic material is exposed, the green light which was not absorbed in the green sensitive silver halide emulsion layer is absorbed in this auxiliary layer. In this case, it is particularly advantageous to place a color contamination prevention layer (i.e., a layer containing, e.g., a hydroquinone derivative as a contamination prevention agent for color images) between the auxiliary layer and the green sensitive emulsion layer since cyan coupling of the colored coupler containing layer due to the oxidation product of a primary aromatic amino developing agent diffused from the green sensitive silver halide emulsion layer at development can be prevented.

When the red sensitive silver halide emulsion layer and the blue sensitive silver halide emulsion layer of the multi-layer color photographic material of this invention are in an order such that the red sensitive silver halide emulsion layer is disposed nearer the support, the above effects are obtained by incorporating the colored cyan coupler of general formula (I) having, in particular, an absorption in the blue wavelength region in an auxiliary layer disposed between the red sensitive silver halide emulsion layer and the green sensitive silver halide emulsion layer.

The amount of the colored couplers such as, for example, the colored cyan couplers of general formula (I) used for the multilayer color photographic materials of this invention depends upon the purpose of the color photographic materials and the structure of the couplers.

The colored coupler can be added to an emulsion layer(s) or an auxiliary layer(s) where the emulsion layer is preferably a red sensitive emulsion layer, which may be divided into two or more layers and in which the two or more layers may be adjacent to each other, and the auxiliary layer is preferably adjacent a red sensitive emulsion layer. The colored coupler of this invention can be added to these divided emulsion layers in any ratio. The colored coupler of the present invention is added to an emulsion layer preferably in an amount of about $10^{-6}$ to about $10^{-13}$ mol/m$^2$, more preferably $10^{-5}$ to $5 \times 10^{-4}$ mol/m$^2$. On the other hand, in an auxiliary layer, the colored coupler is added in an amount of preferably about $5 \times 10^{-5}$ mol/m$^2$ or less.

Various methods can be employed to incorporate the colored couplers such as the colored cyan couplers of general formula (I) in the coating layers constituting the color photographic materials of this invention. Typical examples of these methods are described as follows.

a. The colored coupler is first dissolved in an aqueous solution of an alkali such as sodium hydroxide, potassium hydroxide, lithium hydroxide, calcium hydroxide, magnesium hydroxide, sodium carbonate, potassium carbonate, ammonia, trimethylamine, etc., the aqueous solution of the colored coupler is added to a coating composition for the color photographic material, and, if necessary, the pH of the mixture is adjusted by adding an acid such as acetic acid, citric acid, tartaric acid, hydrochloric acid, sulfuric acid, etc.

b. The colored coupler is dissolved in a water miscible organic solvent such as methanol, ethanol, acetone, dimethylformamide, dimethyl sulfoxide, a mixture of these organic solvents, or a mixture of these organic solvents and water and then the solution of the coupler is added to a coating composition of the color photographic material. In this case the alkali used in method (a) described above can be used.

c. The colored coupler is dissolved in an organic solvent sparingly souble in water, such as ethyl acetate, cyclohexanone, β-butylethoxyethyl acetate, dibutyl phthalate, tricresyl phosphate, etc., or a mixture of these organic solvents, the solution of the coupler is dispersed by emulsification in an aqueous medium, and then the emulsion is added to a coating composition for the color photographic material.

In these cases, an anionic surface active agent such as, for example, a sodium alkylbenzenesulfonate, sodium dioctylsulfosuccinate, sodium dodecylsulfate, a sodium alkylnaphthalenesulfonate, a Fischer type coupler, etc.; an amphoteric surface active agent such as, for example, N-tetradodecyl-N,N-dipolyethylene-α-betaine, etc.; or a nonionic surface active agent such as, for example, sorbitan monolaurate, etc., can be used as a dispersion aid.

The colored coupler of this invention can be incorporated in a silver halide photographic emulsion layer or an auxiliary layer individually or together with a coupler conventionally known in the field of color photography. In this case, the coupler to be incorporated with the colored coupler of this invention can be added to the coating composition as a separate dispersion thereof or can be added thereto as a dispersion thereof with the colored coupler of this invention.

The colored coupler of this invention, such as, for example, the non-diffusible colored cyan coupler, etc., is preferably added as an aqueous alkali solution thereof while the conventional phenolic or naphtholic non-diffusible cyan coupler is added as oil droplets in a high boiling organic solvent.

The multilayer color photographic materials of this invention can contain known color forming couplers in addition to the colored coupler of this invention, such as, for example, the colored cyan couplers of general formula (I). In particular, the color forming couplers represented by the following general formulae (A), (B), (C) or (D) are useful where all alkyl groups or moieties of the groups hereinafter described have 1 to 30 carbon atoms, all aryl groups or moieties are a mono- or polycyclic aryl ring of 6 to 30 carbon atoms and all heterocyclic groups or moieties are a 5- or 6-membered heterocyclic ring which may be condensed with a benzene ring or a naphthalene ring, unless otherwise indicated:

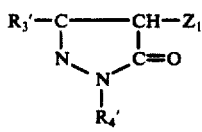
(A)

wherein $R_3'$ represents an amino group (e.g., a 4-(3-sulfobenzamino)anilino group, a 2-chloro-5-acylaminoanilino group, a 2-chloro-5-alkoxycarbonylanilino group, a 2-trifluoromethylphenylamino group, etc.), an acylamino group (e.g., an alkylcarbamido group such as an ethylcarbamido, an arylcarbamido group, such as phenylcarbamido group, etc., a heterocyclic carbamido group such as a benzothiazolylcarbamido group, an alkylsulfamido group such as a methylsulfamido group, etc., or an arylsulfamido group such as a phenylsulfamido group, etc.), or a ureido group (e.g., an alkylureido group, an arylureido group, a heterocyclic ureido group, etc.); $R_4'$ represents an aryl group (e.g., a naphthyl group, a phenyl group, a 2,4,6-trichlorophenyl group, a 2-chloro-4,6-dimethylphenyl group, a 2,6-dichloro-4-methoxyphenyl group, a 4-methylphenyl group, a 4-acylaminophenyl group, a 4-alkylaminophenyl group, a 4-trifluoromethylphenyl group, etc.), or a heterocyclic group (e.g., a benzofuranyl group, a benzothiazolyl group, a quinolinyl group, etc.); $Z_1$ represents a hydrogen atom or a group capable of being released upon coupling with an oxidation product of a para-phenylenediamine color developing agent at color development, such as, for example, a thiocyano group, an acyloxy group where the acyl moiety thereof consists of a carbonyl group bonded to an alkyl group, an aryl group, or a heterocyclic group, aryloxy group, an alkoxy group, an alkoxycarbonyloxy group, an arylazo group, a heterocyclic azo group, etc., as described in U.S. Pat. Nos. 3,419,391, 3,252,924, 3,311,476, 3,227,550 and 3,926,631, and German Patent Application (OLS) 2,418,959.

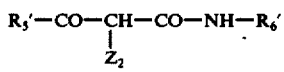
(B)

wherein $R_5'$ represents a secondary, or tertiary alkyl group (e.g., a tert-butyl group, a 1,1-dimethylpropyl group, a 1,1-dimethyl-1-methoxyphenoxymethyl group, etc.), an aryl group (e.g., a phenyl group, an alkylphenyl group such as a 2-methylphenyl group, a 3-octadecylphenyl group, etc., an alkoxyphenyl group such as a 2-methoxyphenyl group, a 4-methoxyphenyl group, etc., a halophenyl group, a 2-chloro-5-alkylcarbamidophenyl group, a 2-chloro-5-[α-(2,4-di-tert-aminophenoxy)butyramido]phenyl group, a 2-methoxy-5-alkylamidophenyl group, or a 2-chloro-5-sulfamidophenyl group, etc.); $R_6'$ represents a phenyl group (e.g., a 2-chlorophenyl group, a 2-halo-5-alkylamidophenyl group, a 2-chloro-5-[α-(2,4-di-tert-amylphenoxy)acetamido]phenyl group, a 2-chloro-5-(4-methylphenylsulfamido)phenyl group, a 2-methoxy-5-(2,4-di-tert-amylphenoxy)acetamidophenyl group, etc.); and $Z_2$ represents a hydrogen atom or a group capable of being released upon coupling with an oxidation product of a para-phenylenediamine color developing agent at color development, such as, for example, a halogen atom, in particular, a fluorine atom, an acyloxy group where the acyl moiety thereof consists of a carbonyl group bonded to an alkyl group, an aryl group, or a heterocyclic group, an aryloxy group, a heterocyclic carbonyloxy group, a phthalimido group, a dioxoimidazolidinyl group, a dioxooxazolidinyl group, a dioxothiazolidinyl group, a dioxomorpholino group, etc., as described in U.S. Pat. Nos. 3,227,550, 3,253,924, 3,277,155, 3,265,506, 3,408,193, and 3,415,652, French Patent 1,411,384, British Patents 944,490, 1,040,710 and 1,118,028, German Patent Applications (OLS) 2,057,941, 2,163,812, 2,213,561, 2,219,917 and 2,423,820.

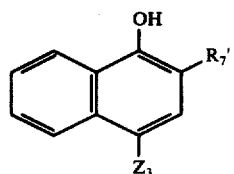
(C)

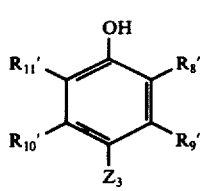
(D)

wherein $R_7'$ represents a substituent usually used for cyan couplers, such as a carbamoyl group which may be substituted with an alkyl group or an aryl group on the nitrogen atom of the carbamoyl group (e.g., an alkylcarbamoyl group such as a methylcarbamoyl group, an arylcarbamoyl group such as a phenylcarbamoyl group, etc.), a sulfamoyl group which may be substituted with an alkyl group or an aryl group on the nitrogen atom of the sulfamoyl group (e.g., an alkylsulfamoyl group, an arylsulfamoyl group such as a phenylsulfamoyl group, etc.), etc.; $R_8'$ represents a carbamido group where the acyl moiety consists of a carbonyl group bonded to an alkyl group, an aryl group, or a heterocyclic ring is substituted on the nitrogen atom of the carbamido group (e.g., an alkylcarbamido group, an arylcarbamido group, etc.), or a sulfamido group; $R_9'$, $R_{10}'$ and $R_{11}'$ each represents a group as defined for $R_8'$ or further represents a halogen atom, an alkyl group or an alkoxy group; and $Z_3$ represents a hydrogen atom or a group capable of being released upon coupling with an oxidation product of a paraphenylenediamine color developing agent at color development, such as, for example, a halogen atom, a thiocyano group, a cycloimido group which includes a 5- or 6-membered mono or dicarboxycycloimido group which may be condensed with a benzene ring or a naphthalene ring (e.g., a maleimido group, succinimido group, 1,2-dicarboxyimido group, etc.), an arylazo group, or a heterocyclic azo group as described in U.S. Pat. Nos. 2,369,929, 2,698,794, 2,474,293, 3,591,383, 3,458,315, 3,311,476, 3,622,328, 3,419,390, 3,034,892, 3,386,301 and 3,476,563 and Japanese Patent Publication 18,145/63 and British Patent 1,201,110.

The couplers represented by the above general formulae (A), (B), (C) and (D) preferably contain a nondiffusible group, etc., i.e., a ballast group as described for the couplers of general formulae (I) and (II).

Typical examples of the couplers used for the multilayer color photographic materials of this invention are shown below by way of illustration only.

Yellow Couplers

α-{3-[α-(2,4-Di-tert-amylphenoxy)butyramido]benzoyl}-2-methoxyacetanilide

α-(2,4-Dioxo-5,5-dimethyloxoazolidine-3-yl)-α-pivaloyl-2-chloro-5-[α-(2,4-di-tert-amylphenoxy)-butyraido]acetanilide α-(4-Carboxyphenoxy)-α-pivaloyl-2-chloro-5-[α-(2,4-di-tert-amylphenoxy)butyramido]acetanilide α-(1-Benzyl-2,4-dioxohydantoin-3-yl)-α-pivaloyl-2-chloro-5-[α-(2,4-di-tert-amylphenoxy)butyramido]-acetanilide α-(4-Methoxybenzoyl)-α-(3,5-dioxomorpholino)-5-[γ-(2,4-di-tert-amylphenoxy)butyramido]-2-chloroacetanilide

Magenta Couplers 1-(2,4,6-Trichlorophenyl)-3-[3-(2,4-di-tert-amylphenoxyacetamido)benzamido]-5-pyrazolone 1-(2,4,6-Trichlorophenyl)-3-[3-(2,4-di-tert-amylphenoxyacetamido)benzamido]-4-acetoxy-5-pyrazolone 1-(2,4,6-Trichlorophenyl)-3-[(2-chloro-5-tetradecanamido)anilino]-5-pyrazolone 1-(2,4-Di-chloro-6-methoxyphenyl)-3-[(2-chloro-5-tetradecanamido)anilino]-4-benzyloxycarbonyloxy-5-pyrazolone 1-(2,4,6-Trichlorophenyl)-3-[3-(2,4di-tert-amylphenoxyacetamido)benzamido]-4-piperidino-5-pyrazolone

Cyan Couplers

1-Hydroxy-N-[γ-(2,4-di-tert-amylphenoxy)propyl]-2-naphthamide

1-Hydroxy-4-chloro-N-[α-(2,4-di-tert-amylphenoxy)-butyl]-2-naphthamide

5-Methyl-4,6-dichloro-2-[α-(3-n-pentadecylphenoxy)-butyramido]phenol

1-Hydroxy-4-[2-(ethoxycarbonyl)phenylazo]-N-(2-ethylhexyl)-2-naphthamide

The multilayer color photographic materials of this invention particularly preferably contain a development inhibitor releasing coupler (DIR coupler), preferably in an amount of 0.05 to 15 mol% per each emulsion layer based on the amount of uncolored coupler, as described in, e.g., U.S. patent application Ser. No. 454,525 filed on Mar. 25, 1974 (German Patent Application (OLS) 2,414,006) and U.S. Pat. No. 3,227,554, in addition to the colored coupler of this invention, such as the colored cyan coupler of general formula (I) and the above described color forming coupler since in this case photographic materials having quite excellent granularity, color reproduction, and sharpness can be obtained. Furthermore, hydroquinones known as development inhibitor releasing hydroquinones (DIR hydroquinones) as described in U.S. Pat. Nos. 3,379,529 and 3,930,863 provide almost the same effect as the DIR coupler.

Particularly preferred DIR couplers are the couplers represented by the following general formula (F) although the DIR couplers used in this invention are not limited to these materials.

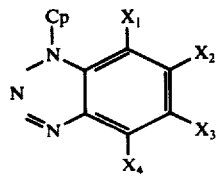

(F)

wherein $X_1$, $X_2$, $X_3$ and $X_4$ each represents a hydrogen atom or a photographically inert group (e.g., a halogen atom, an alkyl group having 1 to 5 carbon atoms, an aryl group which includes a mono or fused ring of 6 to 10 carbon atoms, an acylamino group when the acyl moiety thereof consists of a carbonyl group bonded to an alkyl group having 1 to 5 carbon atoms or an aryl group having 6 to 10 carbon atoms, a nitro group, a cyano group, an amino group, a heterocyclic group, etc.) and Cp represents a coupler residue having a benzotriazole group bonded to the coupling position, more specifically, a coupler residue of an acylacetamide type yellow color forming coupler, a 5-pyrazolone type magenta color forming coupler, or a phenolic cyan color forming coupler.

Furthermore, the DIR hydroquinones represented by the following general formula (G) are particularly preferred in this invention, although the DIR hydroquinones used in this invention are not limited to these compounds only.

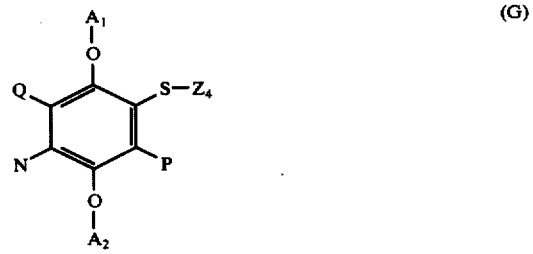

(G)

In the formula Q, N and P each represents a hydrogen atom, an alkyl group (e.g., having 1 to 18 carbon atoms such as methyl, ethyl, octyl, tridecyl and the like), an alkenyl group (e.g., having 2 to 18 carbon atoms such as allyl, octadecenyl and the like), a hydroxyl group, an alkoxy group (e.g., having 1 to 18 carbon atoms such as methoxy, ethoxy and the like), an amino group (e.g., an amino group or a substituted amino group having 1 to 30 total carbon atoms, e.g., an amino group substituted with an alkyl group, an aryl group or a heterocyclic group, such as diethylamino, phenylamino, octadecylamino and the like), an alkylthio group (e.g., nonylthio, tridecylthio and the like), an aryl group (e.g., phenyl, tolyl, and the like), an arylthio group (e.g., phenylthio, tolylthio and the like), a halogen atom, a heterocyclic group (e.g., tetrazolyl, thiazolyl, quinonyl and the like) or an —SZ$_4$ group as later defined (e.g., tetrazolylthio, thiadiazolylthio and the like), and Q and N can combine to form a carbocyclic ring group (e.g., a benzene ring group or a tetrahydrobenzene ring group). $A_1$ and $A_2$ each represents a hydrogen atom or alkaline splitable group selected from acyl groups and alkoxycarbonyl groups (e.g., having 1 to 8 carbon atoms such as acetyl, phenoxycarbonyl, methoxycarbonyl, etc.). $Z_4$ represents a heterocyclic residue which is photographically inactive in a combined state and which can be released at development, and particularly a heterocyclic aromatic group which includes a 5- or 6-membered nitrogen containing heterocyclic group which may be condensed with a benzene ring or a naphthalene ring, such as a tetrazolyl group (e.g., 1-phenyltetrazolyl, 1-alkoxyphenyltetrazolyl and the like), a triazolyl group (e.g., 1-phenyl, 3-n-amyl, 1,2,4-triazolyl and the like), a thiadiazolyl group (e.g., 5-methylthio-thiadiazolyl, 5-propylthiadiazolyl and the like), an oxazolyl group (e.g., 4-methyloxazolyl, benzoxazolyl, β-naphthoxazolyl and the like), an oxadiazolyl group, a thiazolyl group or a pyrimidyl group.

Typical examples of the DIR couplers and DIR hydroquinones preferably used in this invention are specifically shown below:

DIR Couplers

1-[4-(2,4-Di-tert-amylphenoxyacetamido)phenyl]-3-methyl-4-(5- or 6-bromo-1-benzotriazolyl)-5-pyrazolone α-Pivaloyl-α-(5- or 6-bromo-1-benzotriazolyl)-5-[α-(2,4-di-tert-amylphenoxy)butyramido]-2-chloroacetanilide α-(4-Octadecyloxybenzoyl)-α-(5- or 6-octanamido-1-benzotriazolyl)-2-methoxyacetoanilide α-(4-Octadecyloxybenzoyl)-α-[5- or 6-(3-methyl-2-benzothiazolynylidene)amino-1-benzotriazolyl]-2-ethoxyacetanilide 1-(2,4,6-Trichlorophenyl)-3-[(2-chloro-5-tetradecanamido)anilino]-4-(5- or 6-octanamido-1-benzotriazolyl)-5-pyrazolone 1-{4-[α-(2,4-Di-tert-amylphenoxy)butyramido]phenyl}-3-pyrrolidino-4-(1-indazolyl)-5-pyrazolone 1-(4-Acetamidophenyl)-3-(2-methoxy-5-tetradecyloxycarbonyl anilino)-4-(5- or 6-benzyloxy-1-benzotriazolyl)-5-pyrazolone 1-(4-Acetamidophenyl)-3-(2-methoxy-5-tetradecyloxycarbonyl anilino)-4-(5- or 6-bromo-1-benzotriazolyl)-5-pyrazolone 1-[4-(2,4-Di-tert-amylphenoxyacetamido)phenyl]-3-ethoxy-4-(5- or 6-octanamido-1-benzotriazolyl)-5-pyrazolone 1-Benzyl-3-(2-chloro-5-tetradecanamidoanilino)-4-(5- or 6-bromo-1-benzotriazolyl)-5-pyrazolone 1-Benzyl-3-(2-methyl-4-tetradecyloxyanilino)-4-(5- or 6-bromo-1-benzotriazolyl)-5-pyrazolone α-(4-Octadecyloxybenzoyl)-α-(5- or 6-bromo-1-benzotriazolyl)-2-methoxyacetaniline α-(4-Methoxybenzoyl)-α-(5- or 6-octanamido-1-benzotriazolyl)-2-octadecyloxyacetanilide α-Pivaloyl-α-(1-phenyltetrazolylthio)-5-[α-(2,4-di-tert-amylphenoxy)propionamido]-2-chloroacetanilide α-(4-Octadecyloxybenzoyl)-α-(1-phenyltetrazolylthio)-2-methoxyacetanilidie 1-{4-[α-(2,4-Di-tert-amylphenoxy)butyramido]phenyl}-3-dibutylamino-4-(1-phenyltetrazolylthio)-5-pyrazolone 1-{4-[α-(2,4-Di-tert-amylphenoxy)propionamido]phenyl}-3-pyrrolidino-4-(1-phenyltetrazolylthio)-5-pyrazolone 1-{4-[(3-Pentadecylphenoxy)acetamido]phenyl}-3-ethoxy-4-(1-phenyltetrazolylthio)-5-pyrazolone 1-{4-[α-(2,4-Di-tert-amylphenoxy)butyramido]phenyl}-3-(4-methoxyanilino)-4-(1-phenyltetrazolylthio)-5-pyrazolone 1-{4-[α-(2,4-Di-tert-amylphenoxy)butyramido]phenyl}-3-(2,4-dimethylanilino)-4-(1-phenyltetrazolylthio)-5-pyrazolone 1-Benzyl-3-(2-chloro-5-dodecanamidoanilino)-4-(1-phenyltetrazolylthio)-5-pyrazolone 1-Hydroxy-4-(1-phenyltetrazolylthio)-N-[γ-(2,4-di-tert-amylphenoxy)propionyl]-2-naphthamide 1-Hydroxy-4-(1-phenyltetrazolylthio)-(2-chloro-5-hexadecyloxycarbonyl)-2-naphthamide 2-[α-(2,4-Di-tert-amylphenoxy)butyramido]-4-(1-phenyltetrazolylthio)-5-methyl-6-chlorophenol

DIR Hydroquinones 2-n-Dodecylthio-5-(1-phenyltetrazolylthio)hydroquinone 2-n-Octadecylthio-5-(1-phenyltetrazolylthio)hydroquinone 2-n-Hexadecylthio-5-(1-phenyltetrazolylthio)hydroquinone 2-(1'-Phenyltetrazolylthio)-3-phenylthio-6-(1'',1'',3'',3''-tetramethylbutyl)hydroquinone 2-n-Hexadecylthio-5-(1'-phenyltetrazolylthio)-6-phenylthiohydroquinone 2-n-Octadecylthio-5-(1-phenyltetrazolylthio)-6-phenylthiohydroquinone 2-n-Pentadecylthio-5-(1-phenyltetrazolylthio)hydroquinone 2-[2',5'-Dihydroxy-6'-(1''-phenyltetrazol-5''-ylthio)-3'-octadecylphenylthio]benzoic acid methyl ester 2-[2',5'-Dihydroxy-6'-(1''-phenyltetrazol-5''-ylthio)-3'-hexadecylthiophenylthio]benzoic acid amyl ester 2-(2'-Methylthio-1',3',4'-thiadiazol-5'-ylthio)-6-n-pentadecylhydroquinone 2'-(3'-n-Pentyl-4'-phenyl-1',2',4'-triazol-5'-ylthio)-5-hexadecylhydroquinone 2-(6'-Methyl-1',3',3a',7'-tetraazainden-4'-ylthio)-6-(1'',1'',3'',3''-tetramethylbutyl)hydroquinone The photographic light-sensitive materials of the present invention can be conventional photographic light-sensitive materials containing silver halide as a light-sensitive substance.

The silver halide photographic emulsion which can be used in the present invention comprises a light-sensitive silver halide such as silver chloride, silver bromide, silver chlorobromide, silver iodobromide, silver chloroiodide, silver chloroiodobromide, and the like, dispersed in a hydrophilic polymer, and can be prepared by various known methods. For example, a single jet method, a double jet method, a controlled double jet method, and the like, can be employed. A mixture of two or more silver halide emulsions which are prepared separately can also be used.

The silver halide grains can have a homogeneous crystal structure, a layered structure in which the interior differs from the outer layer of the grain, or can be the conversion-type silver halide grains as described in British Patent 635,841 and U.S. Pat. Nos. 2,592,250 and 3,622,318. Silver halide grains which form latent image predominantly on the surface of the grains or predominantly in the interior of the grains can also be used. These photographic emulsions are described, for example, in C. E. K. Mees & T. H. James, *The Theory of the Photographic Process*, 3rd Ed. MacMillan, New York (1966); and P. Glafkides, *Chimie Photographique*, Paul Montel, Paris, (1957), and can be prepared by known methods such as an ammonia method, a neutral method and an acid method.

After the formation of the silver halide grains, the emulsion can be washed with water in order to remove the by-produced water-soluble salts (for example, potassium nitrate where silver bromide is formed from silver nitrate and potassium bromide), and then ripened by heating in the presence of a chemical sensitizer such as sodium thiosulfate; N,N,N'-trimethylthiourea, a thiocyanate complex of monovalent gold, a thiosulfate complex of monovalent gold, stannous chloride, hexamethylenetetramine, and the like, to increase the sensitivity without coarsening the grains. General methods for these chemical seisitization techniques are described in the above-mentioned references.

Specific examples of suitable chemical sensitizers include, for example, gold compounds such as chloroaurates and gold trichloride as described in U.S. Pat. Nos. 2,399,083, 2,540,085, 2,597,856 and 2,597,915; salts of a noble metal, such as platinum, palladium, iridium, rhodium and ruthenium, as described in U.S. Pat. Nos. 2,448,060, 2,540,086, 2,566,245, 2,566,263 and 2,598,079; sulfur compounds capable of forming silver sulfide by reacting with a silver salt, such as those described in U.S. Pat. Nos. 1,574,944, 2,410,689, 3,189,458 and 3,501,313; stannous salts, amines, and other reducing compounds such as those described in U.S. Pat. Nos. 2,487,850, 2,518,698, 2,521,925, 2,521,926, 2,694,637, 2,983,610 and 3,201,254, and the like.

Various kinds of conventional stabilizers or anti-fogging agents can be added to the photographic emulsions used in the present invention in order to prevent a reduction in the sensitivity or a formation of fog. A wide variety of such compounds are known such as heterocyclic compounds, mercury-containing compounds, mercapto compounds or metal salts, including 4-hydroxy-6-methyl-1,3,3a,7-tetraazaindene, 3-methylbenzothiazole and 1-phenyl-5-mercaptotetrazole. Examples of these compounds which can be used are described, for example, in U.S. Pat. Nos. 1,758,576, 2,110,178, 2,131,038, 2,173,628, 2,697,040, 2,304,962, 2,324,123, 2,394,198, 2,444,605 to '608, 2,566,245, 2,694,716, 2,697,099, 2,708,162, 2,728,633 to '665, 2,476,536, 2,824,001, 2,843,491, 2,886,437, 3,052,544, 3,137,577, 3,220,839, 3,226,231, 3,236,652, 3,251,691, 3,252,799, 3,287,135, 3,326,681, 3,420,668 and 3,622,339; and British Patents 893,428, 403,789, 1,173,609 and 1,200,188.

The photographic emulsions can be spectrally sensitized or supersensitized using a cyanine dye such as cyanine, merocyanine, carbocyanine or styryl dyes, either individually or in combination. Spectral sensitization techniques are well known, and are described, for example, in U.S. Pat. Nos. 2,493,748, 2,519,001, 2,977,229, 3,480,434, 3,672,897, 3,703,377, 2,688,545, 2,912,329, 3,397,060, 3,615,635 and 3,628,964; British Patents 1,195,302, 1,242,588 and 1,293,862; German Patent Application OLS Nos. 2,030,326 and 2,121,780; Japanese Patent Publications 4,936/1968, 14,030/1969 and 10,773/1968; U.S. Pat. Nos. 3,511,664, 3,522,052, 3,527,641, 3,615,613, 3,615,632, 3,617,295, 3,635,271 and 3,694,217; and British Patents 1,137,580 and 1,216,203, and the like. The spectral sensitizers can be chosen as desired depending on the spectral range, sensitivity, and the like depending on the purpose and uses of the photographic materials to be sensitized.

Examples of hydrophilic colloids which can be used as a binder for the silver halide grains include, for example, gelatin, colloidal albumin, casein, a cellulose derivative such as carboxymethylcellulose and hydroxyethylcellulose, a polysaccharide derivative such as agar-agar, sodium alginate and a starch derivative, a synthetic hydrophilic colloid such as polyvinyl alcohol, poly-N-vinyl pyrrolidone, polyacrylic acid copolymers, e.g., copolymers with alkyl acrylates, alkyl methacrylates, etc., and polyacrylamide, or the derivatives or partially hydrolyzed products thereof, e.g., the above polymers subjected to a graph polymerization or an acylation, such as disclosed in, for example, U.S. Pat. Nos. 2,376,005; 2,739,137; 3,853,457; 3,062,674; 3,411,911; 3,488,708; 3,525,620; 3,635,715; 3,607,290 and 3,645,740 and British Patent 1,186,699 and the like. If desired, compatible mixtures of these colloids can also be employed. Of these colloids, gelatin is most commonly used. It can be replaced partially or completely by a synthetic polymer, by a gelatin derivative such as those perpared by reacting or modifying the amino, imino, hydroxy or carboxy groups contained, as functional groups, in the gelatin molecule with a compound containing a group capable of reacting with the above-described groups, or a graft gelatin such as those prepared by grafting another polymer chain on the gelatin molecule.

Examples of suitable compounds which can be used for the preparation of the above-described gelatin derivatives include isocyanates, acid chlorides and acid anhydrides such as those described in U.S. Pat. No. 2,614,928; acid anhydrides such as those described in U.S. Pat. No. 3,118,766; bromoacetic acids such as those described in Japanese Patent Publication 5,514/1964; phenyl glycidyl ethers such as those described in Japanese Patent Publication 26,845/1967; vinylsulfones such as those described in U.S. Pat. No. 3,132,945; N-allylvinylsulfonamides such as those described in British Patent 861,414; maleinimides such as those described in U.S. Pat. No. 3,186,846; acrylonitriles such as those described in U.S. Pat. No. 2,594,293; polyalkylene oxides such as those described in U.S. Pat. No. 3,312,553; epoxy compounds such as those described in Japanese Patent Publication 26,845/1967; esters such as those described in U.S. Pat. No. 2,763,639; and alkane sultones such as those described in British Patent 1,033,189.

A wide variety of polymers or copolymers can be employed as polymers to be grafter to gelatin including those obtained from vinyl monomers such as acrylic acid, methacrylic acid or derivatives thereof, e.g., the esters, amides and nitriles thereof; or styrene. Other examples of suitable polymers are described in U.S. Pat. No. 2,763,625; 2,831,767 and 2,956,884; *Polymer Letters*, Vol. 5, page 595 (1967); *Phot. Sci. Eng.*, Vol. 9, page 148 (1965); and *J.Polymer Sci.*, Part A-1, Vol. 9, page 3,199 (1971). Hydrophilic polymers or copolymers having a certain degree of compatibility with gelatin such as those prepared from acrylic acid, methacrylic acid, acrylamide, methacrylamide, hydroxyalkylacrylates, hydroxyalkylmethacrylates, and the like are particularly desirable.

The hydrophilic layers which constitute the photographic light-sensitive materials of the present invention can be hardened using conventional methods. Examples of suitable hardeners include, for example, an aldehyde compound such as formaldehyde and glutaraldehyde; a ketone compound such as diacetyl and cyclopentadione; a reactive halogen-containing compound such as bis(2-chloroethylurea), 2-hydroxy-4, 6-dichloro-1,3,5-triazine and those described in U.S. Pat. Nos. 3,288,775 and 2,732,303; and British Patents 974,723 and 1,167,207; a reactive olefin containing compounds such as divinyl sulfone, 5-acetyl-1, 3-diacryloylhexahydro-1,3,5-triazine and those described in U.S. Pat. Nos. 3,635,718 and 3,232,763; and British Patent 994,869; and N-methylol compounds such as N-hydroxymethylphthalimide and those described in U.S. Pat. Nos. 2,732,316 and 2,586,168; an isocyanate compound such as those described in U.S. Pat. No. 3,103,473; and aziridine compound such as those described in U.S. Pat. Nos. 3,017,280 and 2,983,611; an acid derivative such as those described in U.S. Pat. Nos. 2,725,294 and 2,725,295; a carbodiimide compound such as those described in U.S. Pat. No. 3,100,704; an epoxy compound such as those described in U.S. Pat. No. 3,091,537; an isoxazole compound such as those described in U.S. Pat. Nos. 3,321,313 and 3,543,292; a halocarboxyaldehyde such as mucochloric acid; a dioxane derivative such as dihydroxydioxane and dichlorodioxane; and an inorganic hardener such as chrome alum and zirconium sulfate. Instead of the above compounds, precursors of hardeners such as the alkali metal bisulfite-aldehyde adducts, methylol derivatives of hydantoin, primary fatty nitroalcohols and the like can also be used.

The photographic layers which constitute the photographic light-sensitive materials of the present invention can be applied to a substantially planar material which does not undergo any servere dimensional change during processing, for example, a rigid support such as glass, metal or ceramics, or a flexible support, as desired. Representative flexible supports include those generally employed for photographic materials, such as a cellulose nitrate film, a cellulose acetate film, a cellulose acetate butyrate film, a cellulose acetate propionate film, a polystryene film, a polyethylene terephthalate film, a polycarbonate film, a laminate of these polymers, a thin glass film and paper. A baryta coated paper, a paper which is coated or laminated with an α-olefin polymer, particularly those obtained from a monomer having from 2 to 10 carbon atoms, such as polyethylene, polypropylene and ethylene-butene copolymers, and a syhthetic resin film in which the adhesiveness to other polymers and the printing properties are improved by roughening the surfaces thereof, such as is described in Japanese Patent Publication 19,068/1972, can also be used to advantage as a support.

These supports can be transparent or opaque, depending on the purposes of the photographic materials. Colored transparent supports which contain a dye or pigment can also be used. Such colored supports have been utilized in X-ray films, and are described in *J. SMPTE*, Vol. 67, page 296 (1958).

Examples of opaque supports include opaque films produced by incorporating into a transparent film a dye or a pigment such as titanium oxide and zinc oxide, or surface-treated plastic film such as those described in Japanese Patent Publication 19,068/1972, as well as intrinsically opaque materials such as paper. Highly light-shielding papers and synthetic resin films containing, for example, carbon black or dyes can also be used. When the adhesion between a support and a photographic layer is unsatisfactory, a subbing layer adhesive to both the support and the photographic layer can be provided on the support. The surfaces of the support can also be pre-treated by a corona discharge, a UV radiation treatment, a flame treatment and the like in order to further improve the adhesion.

The photographic layers can be applied to a support using various conventional coating methods, including, for example, dip coating method, air-knife coating, curtain coating and extrusion coating using the hopper as described in U.S. Pat. No. 2,681,294. If desired, two or more layers can be coated simultaneously using the methods as described in U.S. Pat. Nos. 2,761,791; 3,508,947; 2,941,898 and 3,526,528. A suitable coating amoung of the silver halide can range from about $5 \times 10^{-5}$ to about $1 \times 10^{-1}$ mole/m².

The non-diffusible colored couplers of the present invention can be used alone or in combination with conventional colorless color dye forming couplers. Upon use in combination, the non-diffusible colored coupler is not limited, but preferably from 3 to 20 moles, preferably from 5 to 15 moles per 100 moles of a colorless color dye forming coupler is used.

The photographic light-sensitive materials of the present invention can include in addition to the silver halide emulsion layers, substantially light in sensitive layers including conventional layers such as a surface protective layer, a filter layer, an intermediate layer, an antihalation layer, a barrier layer, an anti-curling layer, a backing layer, and the like.

The color photographic materials of this invention can also contain a hydroquinone derivative such as an alkylhydroquinone as a color mixing prevention agent as described below as a fading prevention agent for color images. Such a hydroquinone derivative is advantageously incorporated in one or more interlayers. In particular, in the case of incorporating the colored cyan coupler of the general formula (I) in a layer which does not contain silver halide desposed adjacent a red-sensitive silver halide emulsion layer, it is particularly advantageous to form an interlayer containing the hydroquinone derivative adjacent the layer containing the colored cyan coupler since in this case the diffusion of the oxidation product of a primary aromatic amino developing agent diffused from photosensitive silver halide emulsion layers other than the red-sensitive silver halide emulsion layer can be prevented and also the occurence of desired coloring in silver halide photosensitive silver halide emulsion layers other than the red-sensitive silver halide emulsion layer by the colored cyan coupler of the general formula (I) can be prevented.

The color photographic materials of this invention can further contain a fading prevention agent for color images and examples of these agents are the phenol or hydroquinone derivatives and the precursors thereof as described in Belgian Patent 777,487, German Patent 1,547,684, German Patent Application (OLS) 2,146,668, U.S. Pat. No. 2,336,327; 2,728,659; 2,835,579; and 3,700,453, and German Patent Application (OLS) 2432041, which references also disclose appropriate amounts utilizable.

The aromatic primary amino developing agents which can be used in the method of forming photographic images of the present invention are conventional and include those which have a primary amino group on the aromatic ring and which develop exposed silver halide, and precursors of these compounds.

Suitable color developing agents include o-aminophenols, p-aminophenols, N,N-disubstituted-o-phenylenediamines, and in particular, N, N-disubstituted-p-phenylenediamines. Specific examples of these color developing agents are 4-amino-3-dimethyl-amino-N, N-diethylaniline, 4-amino-3-ethoxy-N, N-diethylaniline, 4-amino-3, 5-dimethyl-N, N-diethylaniline, 4-amino-3-methyl-N, ethyl-N-(β-hydroxyethyl) aniline, 4-amino-3-methyl-N,N-diethylaniline, 4-amino-3-methyl-N-ethyl-N-(β-methanesulfonamidoethyl)-aniline, 4-amino-3-(β-methanesulfonamidoethyl)-N, N-diethylaniline, 4-amino-N-ethyl-N-(β-hydroxyethyl)aniline, 4-amino-N, N-diethyl aniline, 4-amino-N-ethyl-N-ω-sulfobutylaniline, 4-amino-3-methyl-N-ethyl-N-(β-methoxyethyl) aniline, 4-amino-3-methyl-N-ethyl-N-(β-ethoxyethyl) aniline, and the like.

These aromatic primary amino developing agents are described, for example, in U.S. Pat. Nos. 2,193,015 and 2,592,364; Japanese Patent Application (OPI) 64,933/1973; and L.F.A. Mason, *Photographic Processing Chemistry*, pages 226 - 229, Focal Press, London (1966). They can be used, if desired, together with 3-pyrazolidones.

The color developer solution can contain various additives, if desired. Typical examples of these additives include alkali agents (for example, alkali metal or ammonium hydroxides, carbonates or phosphates and the like); pH-adjusting agents or buffers (for example, weak acids such as acetic acid and boric acid; weak bases; salts thereof; and the like); developing accelerators (for example, various pyridinium compounds or cationic compounds such as those described in U.S. Pat. Nos. 2,648,604 and 3,671,247; potassium nitrate; sodium nitrate; condensation products of polyethylene glycol and their derivatives, such as those described in U.S. Pat. Nos. 2,533,990; 2,557,127 and 2,950,970; nonionic compounds such as polythioethers represented by those described in British Patents 1,020,033 and 1,020,032; polymeric compounds having sulfite ester groups such as those described in U.S. Pat. No. 3,068,097; organic amines such as pyridine and ethanolamine; benzyl alcohol; hydrazines and the like); anti-fogging agents (for example, alkali metal bromides; alkali metal iodides; nitrobenzimidazoles such as those described in U.S. Pat. Nos. 2,496,940 and 2,656,271; mercaptobenzimidazole; 5-methylbenzotriazole; 1-phenyl-5-mercaptotetrazole; compounds for use in rapid processing solutions such as those described in U.S. Pat. Nos. 3,113,864; 3,342,596; 3,295,976; 3,615,522 and 3,597,199; thiosulfonyl compounds such as those described in British Patent 972,211; phenazine-N-oxides such as those described in Japanese Patent Publication 41,675/1971; those described in *Kagaku Shashin Benran (Handbood of Photographic Science)* . Vol. II, pages 29 – 47 and the like); stain or sludge preventing agents such as those described in U.S. Pat. Nos. 3,161,513 and 3,161,514; and British Patents 1,030,442; 1,144,481 and 1,251,558; interlayer-effect accelerators as disclosed in U.S. Pat. No. 3,536,487; preservatives (for example, sulfites, bisulfites, hydroxylamine hydrochloride, formaldehyde-sulfite or alkanolamine-sulfite adducts. etc,) and the like.

In the present invention, color developers conventionally used for developing negative color photographic materials, negative or positive cine color films, color papers, and instant color photographic materials can be employed. For example, the color developing processes described in Japanese Patent Publication 35,749/1970, Japanese Patent Applications 67,798/1969; 13,313/1971; and 19,516/1971, and German Patent Application (OLS) 2,238,051 and further in H. Gordon; *The British Journal or Photography,* page 558 (Nov. 15, 1954); ibid., page 440 (Sept. 9, 1955); ibid., page 2 (Jan. 6, 1956); S. Horwitz, ibid., page 212 (Apr. 22, 1960); ibid., page 396 (May 7, 1965); and J. Meech, ibid., page 182 (Apr. 3, 1959) can be used in this invention.

After color development, the color photographic materials are subjected to a bleaching. The bleaching can be simultaneously carried out together with the fixing. A bleaching bath can be converted to a blixing bath by adding a fixing agent, if desired. Many compounds can be used as a bleaching agent. Of these bleaching agents, ferricyanides; bichromates; water-soluble cobalt (III) salts, water-soluble copper (II) salts; water-soluble quinones; nitrosophenol; compounds of a polyvalent metal such as iron (III); cobalt (III); copper (II), etc., especially complex salts of such a polyvalent cation, and an organic acid, for example, an aminopolycarboxylic acid such as ethylenediaminetetraacetic acid, nitrilotriacetic acid, iminodiacetic acid, N-hydroxyethylethylenediaminetriacetic acid acid, etc., malonic acid, tartaric acid, malic acid, diglycolic acid and dithioglycolic acid, and 2,6-dipicolinic acid; peracids such as alkylperacids, persulfates, permanganates and peroxides; hypochlorites; chlorine; bromine; and the like can be suitably used, individually or in combination. To the bleaching solution, bleaching accelerators such as those described in U.S. Pat. Nos. 3,042,520; and 3,241,966; and Japanese Patent Publications 8,506/1970 and 8,836/1970 and various other additives can be employed.

The colored cyan couplers of this invention can also be used for low-silver photographic materials in which the amount of silver halide in the silver halide emulsion layers is from about 0.5 to about 0.01 wt. or mol % of that in the silver halide emulsion layers of conventional photographic materials. In these low-silver type color photographic materials, satisfactory color images can be obtained using a development process in which after subjecting the developed silver formed by the color development to halogenation bleaching, the color photographic material is again color developed to increase the amount of dyes formed as described in U.S. Pat. Nos. 2,623,822 and 2,814,565 or an image forming process in which the amount of formed dyes is increased by utilizing a color intensification process using a peroxide or a cobalt complex salt as described in U.S. Pat. Nos. 3,674,490 and 3,761,265, German Patent Applications (OLS) 2,357,694; 2,044,833; 2,056,359; 2,056,360; and 2,226,770 and Japanese Patent Applications (OPI) 9728/1973 and 9729/1973.

The following non-limiting examples are given to illustrate the present invention, all percentages are weight percentages unless otherwise indicated.

EXAMPLE 1

Multi-layer color photographic Film A was prepared by coating a transparent cellulose triacetate film with the following layers 1 to 8 as illustrated in FIG. 1 of the accompanying drawings.

First Layer: Antihalation layer

A mixture of 1 kg of a 5% aqueous gelatin solution containing black colloidal silver and 1 g of Hardening Agent (1) shown below was coated on the film at a dry thickness of 1 micron.

Second layer: Interlayer

A solution of 50 g of 2,5-di-tert-octylhydroquinone in a mixture of 100 ml of tricresyl phosphate and 200 ml of ethyl acetate was dispersed by emulsification in 1 kg of a 10 wt% aqueous gelatin polution with the addition of sodium di(2-ethylhexyl)-sulfosuccinate using a high-speed stirrer; 250 g of Emulsion I thus prepared was mixed with 1 kg of a 10% gelatin aqueous solution, and, after adding thereto 1 g of Hardening Agent (1), the resultant mixture was coated on the antihalation layer at a dry thickness of 1 micron.

Third layer: Red-sensitive silver halide emulsion layer

A silver halide emulsion (amount of silver: 0.6 mole; iodide content: 7 mole%; mean grain size: 0.6 microns; 6 wt% gelatin) was spectrally sensitized by adding thereto $4 \times 10^{-5}$ mole of Sensitizing Dye I and $1 \times 10^{-5}$ mole of Sensitizing Dye II per kilogram of the emulsion. Then, 70 g of Coupler I, 5 g of Coupler II, and 6 g of Coupler III were dissolved in a mixture of 50 ml of tricresyl phosphate and 100 ml of ethyl acetate and Emulsion II was prepared from the solution in the same manner as in the case of preparing Emulsion I; 450 g of Emulsion II was added to 1 kg of the spectrally sensitized silver halide emulsion prepared above. Thereafter, after adding to the mixture 90 ml of a 5% aqueous alkali solution (containing 0.1 N NaOH) of Coupler (1) of this invention, 30 ml of a 2% aqueous citric acid solution, and further 0.7 g of Hardening Agent (1), the resultant mixture was coated at a dry thickness of 4.5 microns.

Fourth layer: Interlayer
Same as the second layer.
Fifth layer: Green-sensitive silver halide emulsion layer A silver iodobromide emulsion having the same composition as that used for forming the third layer was spectrally sensitized using $2 \times 10^{-4}$ mole of Sensitizing Dye III and $6 \times 10^{-5}$ of Sensitizing Dye IV per kilogram of the emulsion. Then, 80 g of Coupler IV, 15 g of Coupler V, and 5 g of Coupler VI were dissolved in a mixture of 100 ml of tricresyl phosphate and 200 ml of ethyl acetate. Emulsion III was prepared from the solution in the same manner as in the case of preparing Emulsion I, 600 g of Emulsion II was added to 1 kg of the spectrally sensitized silver halide emulsion, and after adding thereto 0.9 g of Hardening Agent (1), the resultant mixture was coated at a dry thickness of 4 microns.

Sixth layer: Yellow filter layer.
Seventh layer: Blue-sensitive silver halide emulsion layer Emulsion IV was prepared in the same manner as in the case of preparing Emulsion I from a solution of 100 g of Coupler VII in a mixture of 100 ml of dibutyl phthalate and 200 ml of ethyl acetate and 500 g of Emulsion IV thus prepared was added to 1 Kg of a silver iodobromide emulsion (not spectrally sensitized) having the same composition as that used for forming the third layer. After adding further to the mixture 1 g of Hardening Agent (1), the resultant mixture was coated at a dry thickness of 3 microns.

Eight layer: Protective layer
A mixture of 1 kg of a 10% gelatin aqueous solution and a 1 g of Hardening Agent (1) was coated at a dry thickness of 1 micron.

The materials used in preparing color photographic Film A were as follows:

Hardening Agent (1): 2,6-Di-chloro-4-hydroxy-s-triazine salt. (2% aqueous solution)
Coupler I: 1-Hydroxy-N-[α-(2,4-di-tert-amylphenoxy)-propyl]-2-naphthamide.
Coupler II: 1-Hydroxy-4-(4-ethoxycarbonylphenylazo)-N-dodecyl-2-naphthamide.
Coupler III: α-(4-Stearyloxybenzoyl)-α-[5- or 6-(3-methyl-2-benzothiazolynylidene)amino-1-benzotriazolyl]-2-methoxyacetanilide
Coupler IV: 1-(2,4,6-Trichlorophenyl)-3-{3-[α-(2,4-di-tert-amylphenoxy)butyramido]benzoylamino}-5-pyrazolone.
Coupler V: 1-(2,4,6-Trichlorophenyl)-3-(2-chloro-5-tetradecanoylaminoanilino)-4-(3-methyl-5-hydroxyphenylazo)-5-pyrazolone.
Coupler VI: 1-Benzyl-3-(2-chloro-5-tetradecylaminoanilino)-4-(2-or 4-octanamido-1-benzotriazolyl)-5-pyrazolone.
Coupler VII: α-Pivaloyl-α-(N-benzylhydantoinyl)-2-chloro-5-[α-(2,4-di-tert-amylphenoxy)butyramido]-acetanilide.

Film B was also prepared in the same manner as in the case of preparing Film A except that a 5% aqueous alkali solution of Coupler VIII was used in place of Coupler (1) in the third layer.

Coupler VIII: 1-Hydroxy-4-[4-(1-hydroxy-3,6-disulfo-8-acetamido-2-naphthylazo)phenoxy]-N-[γ-(2,4-di-tert-amylphnoxypropyl)]-α-naphthamide.

Film C was further prepared in the same manner as in the case of preparing Film A except that Emulsion V prepared in the same manner as in the case of preparing Emulsion I from a solution of Couplers I, II, and III further contained 5g of Coupler IX in a mixture of 50ml of tricresyl phosphate and 100 ml of ethyl acetate and wherein Coupler (1) was omitted was used in place of Emulsion III of the third layer.

Coupler IX: 1-Hydroxy-4-(2-ethoxycarbonylphenylazo)-N-(2-ethylhexyl)-2-naphthamide.
Sensitizing Dye I: Anhydro-5,5'-dichloro-3,3'-disulfopropyl-9-ethylthiacarbocyanine hydroxide pyridinium salt.
Sensitizing Dye II: Anhydro-9-ethyl-3,3'-di(3-sulfopropyl)-4,5,4',5'-dibenzothiacarbocyanine hydroxide ethylamine salt.
Sensitizing Dye III: Anydro-9'-ethyl-5,5'-dichloro-3,3'-disulfopropyloxacarbocyanine sodium salt.
Sensitizing Dye IV: Anhydro-5,6,5',6'-tetrachloro-1,1'-diethyl-3,3'-disulfopropoxyethylimidazolocarbocyanine hydroxide sodium salt.

A negative type color photographic film which corresponded to each of the Films A, B, and C thus prepared was exposed in a still camera and then the photographic film was processed using the following development process (1) at 38° C.

1. Color Development: 3 min. 15 sec.
2. Bleach: 6 min. 30 sec.
3. Wash: 3 min. 15 sec.
4. Fix: 6 min. 30 sec.
5. Wash: 3 min. 15 sec.
6. Stabilization: 3 min. 15 sec.

The composition of the processing solutions used for the above processes were as follows:

Color Developer

Sodium Nitrilotriacetate: 1.0 g
Sodium Sulfite: 4.0 g
Sodium Carbonate: 30.0 g
Potassium Bromide: 1.4 g
Hydroxylamine Sulfate: 2.4 g
4-(N-Ethyl-N-β-hydroxyethylamino)-2-methylanilino Sulfate: 4.5 g
Water to make: 1 liter.

Bleach Solution

Ammonium Bromide: 160.0 g
Ammonia (28% aq. soln.): 25.0 ml
Sodium Ethylenediaminetetraacetate Iron Salt: 130.0 g.
Glacial Acetic Acid: 14.0 ml
Water to make: 1 liter.

Fix Solution

Sodium Tetrapolyphosphate; 2.0 g
Sodium Sulfite: 4.0 g
Ammonium Thiosulfate (70% aq. soln.): 175.0 ml Sodium Bisulfite: 4.6 g
Water to make: 1 liter.

Stabilization Solution

Formaldehyde (40% aq. soln.): 8.0 ml
Water to make: 1 liter.

The results showed that the color negative obtained from Film A included in the color photographic materials of this invention was markedly superior to the color negative obtained from comparison Film C in sharpness and color purity. Also, it was confirmed that the color negative obtained from film B had a large amount of fog in the red-sensitive silver halide emulsion layer as compared with film A of this invention and was inferior to Films A and C in granularity. The above results demonstrate that the color negative obtained from Film A had quite excellent sharpness, granularity, and color purity.

Figure 2:
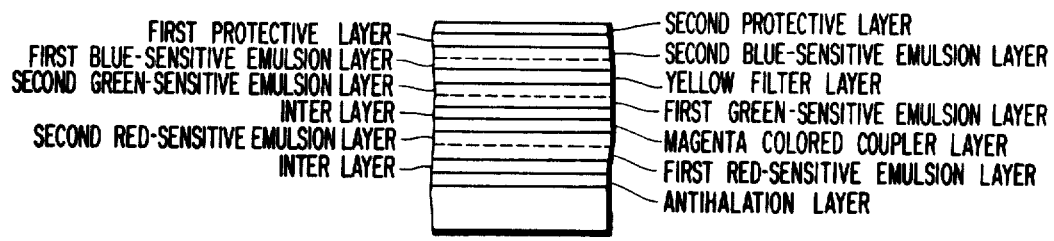

A multi-layer color photographic material having the layer structure as shown in FIG. 2 of the accompanying drawings was prepared in the same manner as in the case of Example 1. The composition of each coating layer was as follows:

First layer: Antihalation layer
Same as the first layer of Film A in Example 1.
Second layer: Interlayer To a mixture of 250 g of an emulsion having the same composition as Emulsion I used for forming the second layer of Film A in Example 1 and 1 kg of a 10% gelatin aqueous solution were added 30 ml of a 5% aqueous alkali solution (containing 0.1 N NaOH) of Coupler (1) of this invention, 10 ml of a 2% aqueous solution of citric acid, and further 1 g of Hardening Agent (1), and then the resultant mixture was coated on the antihalation layer at a dry thickness of 1 micron.

Third layer: First red-sensitive silver halide emulsion layer (dry thickness of 2 microns)

A silver iodobromide emulsion (amount of silver: 0.05 mole%; content of iodide of silver halide grains: 7 mole%; mean grain size of silver halide grains: 0.4 micron; content of gelatin: 6.2%) containing the following components was coated at a coverage of 1.4 g/m$^2$ of silver.

Sensitizing Dye I: $5 \times 10^{-5}$ mole per mole of silver
Sensitizing Dye II: $1.2 \times 10^{-5}$ mole per mole of silver
Coupler I: 0.09 mole per mole of silver
Coupler II: 0.02 mole per mole of silver
Coupler III: 0.01 mole per mole of silver
Hardening Agent (1): 2 mg/m$^2$ per mole of silver Fourth layer: Second red-sensitive silver halide emulsion layer (dry thickness of 1.5 microns)

A silver iodobromide emulsion (amount of silver: 0.05 mole%; iodide content of silver halide grains: 8 mole%; mean grain size of silver halide grains: 0.7 micron; content of gelatin: 6%) containing the following components was coated at a coverage of 1.0 g/m$^2$ of silver.

Sensitizing Dye I: $3 \times 10^{-5}$ mole per mole of silver
Sensitizing Dye II: $1.2 \times 10^{-5}$ mole per mole of silver
Coupler I 0.05 mole per mole of silver
Coupler II: 0.03 mole per mole of silver
Coupler III: 0.01 mole per mole of silver
Hardening Agent (1): 15 mg/m$^2$ per mole of silver Fifth layer: Magenta colored coupler layer This layer was formed in the same manner as in the case of forming the second layer except that 30 ml of a 5% aqueous alkali solution of Coupler (1) was changed to 70 ml of the same Coupler (1) solution and 10 ml of a 2% aqueous solution of citric acid was changed to 27 ml of the same citric acid solution. The dry thickness was 1.2 microns.

Sixth layer: Interlayer
Same as the second layer of Film A in Example 1.

Seventh layer: First green-sensitive silver halide emulsion layer (dry thickness of 2.4 microns)

A silver iodobromide emulsion having the same composition as that of the silver halide emulsion used for forming the third layer and containing the following components was coated at a coverage of 1.4 g/m.$^2$ of silver.

Sensitizing Dye III: $3 \times 10^{-5}$ mole per mole of silver
Sensitizing Dye IV: $1 \times 10^{-5}$ mole per mole of silver
Coupler IV: 0.05 mole per mole of silver Coupler V: 0.01 mole per mole of silver
Coupler VI: 0.005 mole per mole of silver
DIR Hydroquinone I: 0.004 mole per mole of silver
Hardening Agent (1): 25 mg/m.$^2$ per mole of silver Eighth layer: Second green-sensitive silver halide emulsion layer (dry thickness of 1.8 microns)

A silver iodobromide emulsion having the same composition as that of the silver halide emulsion used for forming the fourth layer and containing the following components was coated at a coverage of 2.5 g/m$^2$ of silver.

Sensitizing Dye III: $2.4 \times 10^{-5}$ mole per mole of silver
Sensitizing Dye IV: $0.8 \times 10^{-5}$ mole per mole of silver
Coupler IV: 0.005 mole per mole of silver
Coupler V: 0.015 mole per mole of silver
Coupler VI: 0.0006 mole per mole of silver
Hardening Agent (1): 20 mg/m$^2$ per mole of silver Ninth layer: Yellow filter layer
Same as the sixth layer of Film A in Example 1.

Tenth layer: First blue-sensitive halide emulsion layer (dry thickness of 2 microns)

A silver iodobromide emulsion (amount of silver: 0.048 mole%; iodide content of silver halide grains: 7 mole%; mean grain size of silver halide grains: 0.5 micron: gelatin content (6%) containing the following components was coated at a coverage of 1.3 g/m$^2$ of silver.

Coupler VII: 0.25 mole per mole of silver
Hardening Agent (1): 20 mg/m$^2$

Eleventh layer: Second blue-sensitive silver halide emulsion layer (dry thickness of 1.3 microns)

A silver iodobromide emulsion (amount of silver: 0.052 mole%; iodide content of silver halide grains: 6 mole%; mean grain size of silver halide grains: 0.7 micron; gelatin content: 6%) containing the following components was coated at a coverage of 1.2 g/m$^2$ of silver.

Coupler VII: 0.06 mole per mole of silver
Hardening Agent (1): 8 mg/m$^2$

Twelfth layer: First protective layer (dry thickness of 1 micron)

A silver iodobromide emulsion (amount of silver: 0.06 mole%; mean grain size of silver halide grains: 0.05 micron, gelatin content: 6%) containing 7 mg/m$^2$ of Hardening Agent (1) was coated at a coverage of 0.4 g/m$^2$ of silver.

Thirteenth layer: Second protective layer
Same as the eighth layer of Film A in Example 1.

Of the materials used for preparing Film D, the couplers, sensitizing dyes, and hardening agent were same as those used for forming Film A and the other material was as follows:

DIR Hydroquinone (I): 2-n-Hexadecylthio-5-(1-phenyltetrazol-5-ylthio)-6-phenylthiohydroquinone.

A negative type color photographic film was prepared from Film D as in the case of Films A to C in Example 1, exposed, and processed in the same manner as in Example 1. The results showed that the color negative obtained from Film D was far superior to that of Film A in sharpness, granularity, and color purity.

When Coupler (5), (8), or (13) of this invention was substituted for Coupler (1) in Films A and D, almost the same results were obtained.

While the invention has been described in detail and with reference to specific embodiments thereof, it will be apparent to one skilled in the art that various changes and modifications can be made therein without departing from the spirit and scope thereof.

What is claimed is:

1. A color photographic material comprising a support having photographic silver halide emulsion layers and auxiliary layers thereon, with at least one of said photographic layers containing a non-diffusible colored coupler which releases, on coupling reaction with the oxidation product of a primary aromatic amino developing agent at development, a diffusible dye capable of being removed from the photographic layer, said non-diffusible colored coupler being represented by general formula (I):

$$A - O - SO_2 - R - B \qquad (I)$$

wherein R represents an alkylene group having 1 to 10 carbon atoms; A represents an image forming coupler residue containing a phenol nucleus or a naphthol nucleus, and wherein the —O-SO$_2$-R-B group is bonded to the coupling position of the coupler residue and the group can be released upon oxidative coupling with an aromatic primary amine developing agent to form a dye; and B represents a residue containing a chromophore which renders the coupler colored and which consists of a dye component having its spectral absorption in the visible region.

2. The color photographic material of claim 1, in which said residue containing a chromophore is an azo dye residue represented by the following general formula:

—(O)$_m$-[Ar$_1$]-N=N-[Ph$_1$],

—(O)$_m$-[Ar$_1$]-N=N-[Ar$_2$] or

—(O)$_m$-[Ar$_1$]-N=N-[Het]

wherein m is 0 or 1; —[Ar$_1$]— represents an arylene group; —[Ph$_1$] represents a phenyl group having a water-soluble group or a hydrophilic group; —[Ar$_2$] represents a hydroxynaphthyl group having a water-soluble group or a hydrophilic group; and —[Het] represents an aromatic [heterocyclic group] 5- or 6-membered nitrogen containing heterocyclic group which may be condensed with a benzene ring or a naphthalene ring.

3. The color photograhic material of claim 1, in which said non-diffusible colored coupler is represented by the general formula (II):

$$R_1 - A_1 - O - SO_2 - R - B \qquad (II)$$

wherein A$_1$ represents a cyan image forming coupler residue containing a phenol nucleus or a cyan image forming coupler containing an α-naphtholic nucleus; wherein the —O-SO$_2$-R-B group is bonded to the coupling position of the coupler residue and the group can be released upon oxidative coupling with an aromatic primary amino developing agent to form a dye; R and B each has the same meaning as defined in general formula (I); and R$_1$ is an acylamino group represented by general formula (III) or a carbamoyl group represented by general formula (IV):

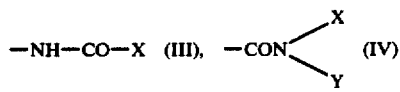

$$-NH-CO-X \quad (III), \quad -CON\begin{matrix}X\\Y\end{matrix} \quad (IV)$$

wherein X reprsents a straight or branched chain alkyl group having 1 to 32 carbon atoms, a cycloalkyl group or an aryl group, wherein the above described alkyl group and aryl group can be substituted with a cyano group, a hydroxy group, a carboxy group; an amino group, an aryl group, an alkoxycarbonyl group, an acyloxycarbonyl group, an amido group, an imido group, a carbamoyl group, a sulfamoyl group, an alkoxy group, or an aryloxy group, and Y represents a hydrogen atom or a group as defined for X.

4. The color photographic material of claim 3, in which said non-diffusible colored coupler is represented by general formulae (V) or (VI):

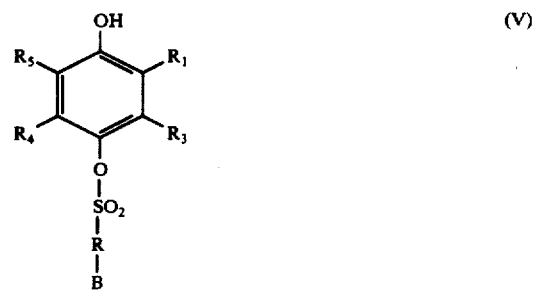

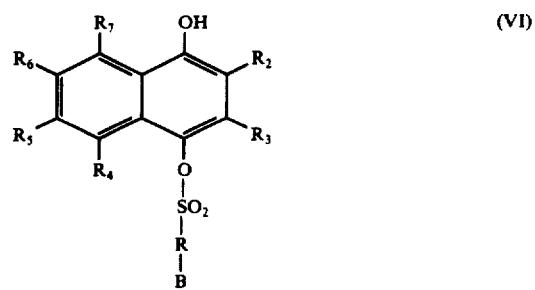

wherein R, B and R$_1$ each has the same meaning as defined in general formula (II), R$_2$ represents a carbamoyl group represented by general formula (IV); and R$_3$, R$_4$, R$_5$, R$_6$ and R$_7$ each represents a hydrogen atom, a halogen atom, an alkyl group, an alkoxy group or an alkylthio group wherein the alkyl moiety of these groups has 1 to 8 carbon atoms.

5. A multilayer color photographic material comprising a support having thereon at least a blue-sensitive silver halide emulsion layer containing a yellow dye-forming coupler, a green sensitive silver halide emulsion layer containing a magenta dye-forming coupler, and a red-sensitive silver halide emulsion layer containing a cyan dye-forming coupler, said red-sensitive silver halide emulsion layer or a gelatin interlayer adjacent said red-sensitive silver halide emulsion layer containing a non-diffusible colored coupler which releases, on coupling reaction with the oxidation product of a primary aromatic amino developing agent at development, a diffusible dye capable of being diffused from the photographic layer during development, said non-diffusible colored coupler being represented by general formula (I):

$$A-O-SO_2-R-B \tag{I}$$

wherein R represents an alkylene group having 1 to 10 carbon atoms; A represents an image forming coupler residue containing a phenol nucleus or a naphthol nucleus, and wherein the —$O-SO_2-R-B$ group is bonded to the coupling position of the coupler residue and the group can be released upon oxidative coupling with an aromatic primary amine developing agent to form a dye; and B represents a residue containing a chromophore which renders the coupler colored and which consists of a dye component having its spectral adsorption in the visible region.

6. The color photographic material of claim 1, wherein —[$Ar_2$] is selected from the group consisting of:

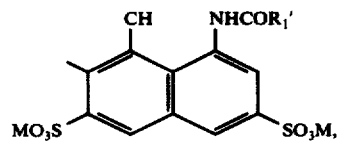

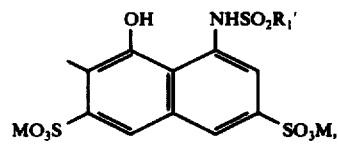

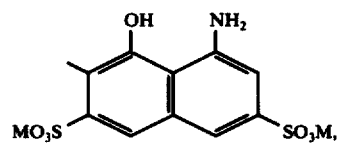

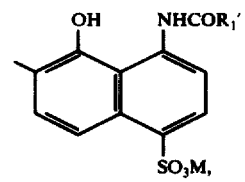

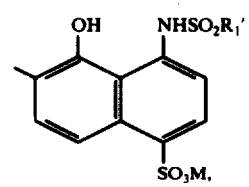

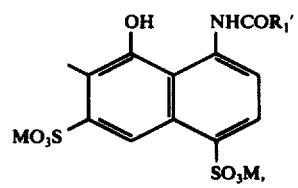

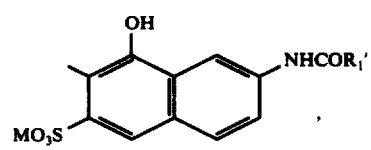

-continued

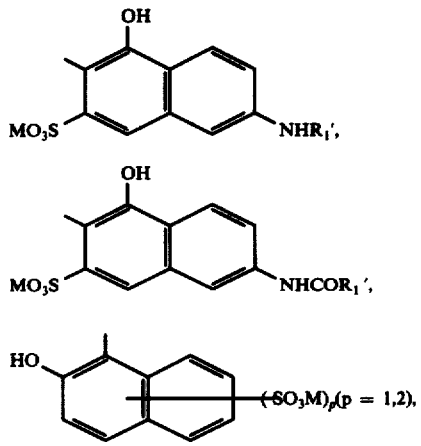

, and wherein $R_1$ represents an alkyl group having 1 to 7 carbon atoms, a hydrogen atom, a phenyl group or a naphthyl group, and M represents a cation.

7. The color photographic material as claimed in claim 1, wherein said color coupler is selected from the group consisting of compounds (1) to (15) below:

1. 1-Hydroxy-4-{γ-[4-(1-hydroxy-3,6-disulfo-8-acetamido-2-naphthylazo)phenoxy]propylsulfonyloxy}-2-N-[γ-(2,4-di-tert-amylphenoxy)propyl]naphthamide.disodium salt, 2. 1-Hydroxy-4-{γ-[4-(1-hydroxy-3,6-disulfo-8-acetamido-2-naphthylazo)phenoxyloxy}-2-N-(2'-chloro-5'-hexadecyloxycarbonyl)naphthanilide.disodium salt, 3. 1-Hydroxy-4-{γ-[4-(1-hydroxy-3,6-disulfo-8-acetamido-2-naphthylazo)phenoxy]propylsulfonyloxy}-2-N-(2'-tetradecyloxy)naphthanilide.disodium salt, 4. 1-Hydroxy-4-[4-(1-hydroxy-3,6-disulfo-8-acetamido-2-naphthylazo)benzylsulfonyloxy]-2-N-[γ-(2,4-di-tert-amylphenoxy)propyl]naphthamide.disodium salt, 5. 1-Hydroxy-4-{γ-[4-(1-hydroxy-3,6-disulfo-8-acetamido-2-naphthylazo)phenoxy]propylsulfonyloxy}-2-N-hexadecylnaphthamide disodium.salt, 6. 1-Hydroxy-4-{γ-[4-(1-hydroxy-3,6-disulfo-8-acetamido-2-naphthylazo)phenoxy]propylsulfonyloxy}-2-[2-chloro-5-(2,4-di-tert-amylphenoxy)acetamido]naphthanilide.disodium salt, 7. 1-Hydroxy-4-{γ-[4-(1-hydroxy-3,6-disulfo-8-acetamido-2-naphthylazo)phenoxy]propylsulfonyloxy}-2-[N-(γ-decyloxy)propyl]naphthamide.disodium salt, 8. 1-Hydroxy-4-{γ-[4-(1-hydroxy-3,6-disulfo-8-acetamido-2-naphthylazo)phenoxy]propylsulfonyloxy}-2-(N-dodecyl)naphthamide.disodium salt, 9. 1-Hydroxy-4-{4-[4-(1-hydroxy-3,6-disulfo-8-acetamido-2-naphthylazo)phenoxy]benzylsulfonyloxy}-2-N-(β-cyanoethyl)-N-hexadecylnaphthamide.disodium salt, 10. 4-{γ-[4-(1-Hydroxy-3,6-disulfo-8-acetamido-2-naphthylazo)-phenoxy]propylsulfonyloxy}-2-(2,4-di-tert-amylphenoxy)acetamidophenol.disodium salt, 11. 2-(2,2,3,3,4,4,5,5-Octafluoropentanamido)-4-{γ-[4-(1-hydroxy-3,6-disulfo-8-acetamido-2-naphthylazo)-phenoxy]propylsulfonyloxy}-5-tetradecanamidophenol.disodium salt, 12. 2-Chloro-3-methyl-4-{γ-[4-(4-sulfophenylazo)phenoxy]propylsulfonyloxy}-6-(2,4-di-tert-amylphenoxy)acetamidophenol.sodium salt, 13. 2-Chloro-3-methyl-4-{γ-[4-(1-hydroxy-3,6-disulfo-8-acetamido-2-naphthylazo)phenoxy]propylsulfonyloxy}-6-[α-(2,4-di-tert-amylphenoxy)butyramido]phenol.disodium salt, 14. 1-Hydroxy-4-{γ-[4-1-hydroxy3,6-disulfo-8-benzamido-2-naphthylazo)phenoxy]propylsulfonyloxy}-2-(N-dodecyl)naphthamide.disodium salt, 15. 3-Acetamido-6-[γ-(2,4-di-tert-amylphenoxy)-butyramido]-4-{γ-[4-(1-hydroxy-5-sulfo-8-acetamido-2-naphthylazo)phenoxy]-propylsulfonyloxy}phenol.disodium salt.

8. The color photographic material as claimed in claim 1, wherein said colored coupler is contained in at least one of said photographic silver halide emulsion layers or at least one of said auxiliary layers.

9. The color photographic material of claim 1, wherein said colored coupler is used in combination with a conventional colorless coupler or couplers so that the relative coupling speed of the colored coupler 1 to 10 times higher than that of the conventional colorless coupler or couplers used.

10. The color photographic material of claim 1, wherein said colored coupler is present in an emulsion layer and is present in an amount of about $10^{-6}$ to about $10^{-3}$ mol/m$^2$.

11. The color photographic material of claim 1, wherein said colored coupler is present in an auxiliary layer and said colored coupler is present in an amount of about 5 times $10^{-5}$ mol$^2$ or less.

12. The color photographic material of claim 1, wherein B is a residue consisting of an arylazoaryl group or an arylazoaryloxy group, wherein the aryl or arylene moiety thereof is a phenyl group, a phenylene group, a naphthyl group, a naphthalene group or an aromatic heterocyclic ring, which can contain from 1 to 3 water soluble or hydrophilic groups.

13. The color photographic material of claim 1, wherein —[Het] further comprises a water soluble group.

14. The color photographic material of claim 13, wherein said water soluble group is —SO$_3$M or —COOM, wherein M represents a cation.

15. The color photographic material of claim 14, wherein —[Het] has the formula:

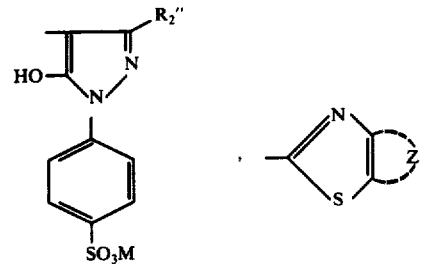

where X represents a non-metallic atomic group necessary to form a fused aromatic ring, which ring can be substituted with an alkyl group having 1 to 4 carbon atoms, a halogen atom, a nitro group, or an acylamino group, wherein M is an alkali metal ion or an ammonium ion or a hydrogen atom; R$_2$" represents an amino group, an alkyl group having 1 to 5 carbon atoms, an acylamino group where the acyl moiety consists of a carbonyl group bonded to an alkyl group having 1 to 4 carbon atoms or an aryl group, a sulfonamido group, an ureido group, an alkoxycarbonyl group having 2 to 9 carbon atoms or a carboxy group.

* * * * *